US012149994B2

(12) United States Patent
Wei et al.

(10) Patent No.: US 12,149,994 B2
(45) Date of Patent: Nov. 19, 2024

(54) HANDOVER PROCEDURES IN A SIDELINK WIRELESS COMMUNICATIONS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 379 days.

(21) Appl. No.: 17/621,691

(22) PCT Filed: Jun. 10, 2020

(86) PCT No.: PCT/EP2020/066126
§ 371 (c)(1),
(2) Date: Dec. 22, 2021

(87) PCT Pub. No.: WO2021/001130
PCT Pub. Date: Jan. 7, 2021

(65) Prior Publication Data
US 2022/0353761 A1 Nov. 3, 2022

(30) Foreign Application Priority Data
Jul. 3, 2019 (EP) .................................... 19184207

(51) Int. Cl.
H04W 4/00 (2018.01)
H04W 36/00 (2009.01)
(52) U.S. Cl.
CPC ... H04W 36/0079 (2018.08); H04W 36/0016 (2013.01); H04W 36/0072 (2013.01)
(58) Field of Classification Search
CPC ......... H04W 36/0079; H04W 36/0016; H04W 36/0072
See application file for complete search history.

(56) References Cited

U.S. PATENT DOCUMENTS

2008/0026760 A1* 1/2008 Park ................... H04W 36/0079
455/437
2012/0094711 A1* 4/2012 Lee .................... H04W 36/0079
455/525

(Continued)

FOREIGN PATENT DOCUMENTS

EP 3016469 A1 5/2016

OTHER PUBLICATIONS

International Search Report and Written Opinion mailed on Nov. 2, 2020, received for PCT Application PCT/EP2020/066126, Filed on Jun. 10, 2020, 17 pages.

(Continued)

Primary Examiner — Abdelnabi O Musa
(74) Attorney, Agent, or Firm — XSENSUS LLP

(57) ABSTRACT

A method of operating a first communications device to communicate with a second communications device, the method comprising transmitting or receiving signals representing data to or from the second communications device over a wireless interface, the signals being transmitted or received by the second communications device in accordance with a current configuration, determining that the current configuration is to be changed to a new configuration, transmitting a handover command to the second communications device over the wireless interface, the handover command comprising an indication of the new configuration to replace the current configuration, and receiving via the wireless interface a handover reject indication from the second communications device, the handover reject indication indicating to the first communications device that the second communications device is to continue to operate in accordance with the current configuration.

18 Claims, 8 Drawing Sheets

(56) References Cited

U.S. PATENT DOCUMENTS

| | | | |
|---|---|---|---|
| 2015/0049734 A1* | 2/2015 | Park | H04W 36/08 |
| | | | 370/331 |
| 2015/0172988 A1* | 6/2015 | Lai | H04W 36/08 |
| | | | 455/436 |
| 2016/0029150 A1 | 1/2016 | Hamada | |
| 2018/0132297 A1* | 5/2018 | Li | H04W 72/121 |
| 2019/0098686 A1 | 3/2019 | Martin et al. | |
| 2019/0239132 A1* | 8/2019 | Wallentin | H04W 36/0069 |
| 2020/0037218 A1* | 1/2020 | Karampatsis | H04W 88/04 |
| 2022/0086705 A1* | 3/2022 | Wang | H04W 24/02 |
| 2022/0361069 A1* | 11/2022 | Zhang | H04W 72/23 |

OTHER PUBLICATIONS

3GPP, "Study on NR Vehicle-to-Everything (V2X) (Release 16)", 3GPP TR 38.885 V16.0.0, Mar. 2019, 122 pages.
Vodafone, "New SID: Study on NR V2X", 3GPP TSG RAN Meeting #80, RP-181429, Jun. 11-14, 2018, 5 pages.
Samsung, "CSMA/CA Based Resource Selection", 3GPP TSG-RAN WG2 #84, R2-133840, Nov. 11-15, 2013, 4 pages.
3GPP, "Study on Vehicle-to-Everything (Release 16)", 3GPP TR 38.885 V1.0.0, Nov. 2018, 23 pages.
Holma et al., "LTE for UMTS OFDMA and SC-FDMA Based Radio Access", John Wiley & Sons, 2009, pp. 25-27.

* cited by examiner

HANDOVER PROCEDURES IN A SIDELINK WIRELESS COMMUNICATIONS

CROSS-REFERENCE TO RELATED APPLICATIONS

The present application is based on PCT filing PCT/EP2020/066126, filed Jun. 10, 2020, which claims priority to EP 19184207.9, filed Jul. 3, 2019, the entire contents of each are incorporated herein by reference.

BACKGROUND

Field of Disclosure

The present disclosure relates to methods and apparatus for the communication of signals between communications devices in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy mobile telecommunications networks is therefore strong and the coverage area of these networks, i.e. geographic locations where access to the networks via infrastructure equipment is possible, is expected to increase rapidly.

However, there may remain limitations on network capacity and the geographical areas that can be served by such networks.

These limitations may, for example, be particularly relevant in situations in which networks are experiencing high load and high-data rate communications between communications devices, or when communications between communications devices are required but the communications devices may not be within the coverage area of network infrastructure equipment.

In other scenarios, a latency for the transmission of data via network infrastructure equipment may be undesirable.

It has therefore been proposed that a communications device may communicate directly with another communications device in a peer-to-peer, or device-to-device (D2D) manner, that is without the data being transmitted from one device to the other via network infrastructure equipment.

However, this raises challenges when radio links used for the transmission of the data are, or become unsuitable.

There is therefore a need for handover procedures for use in peer-to-peer communications which can overcome some of these issues.

SUMMARY OF THE DISCLOSURE

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
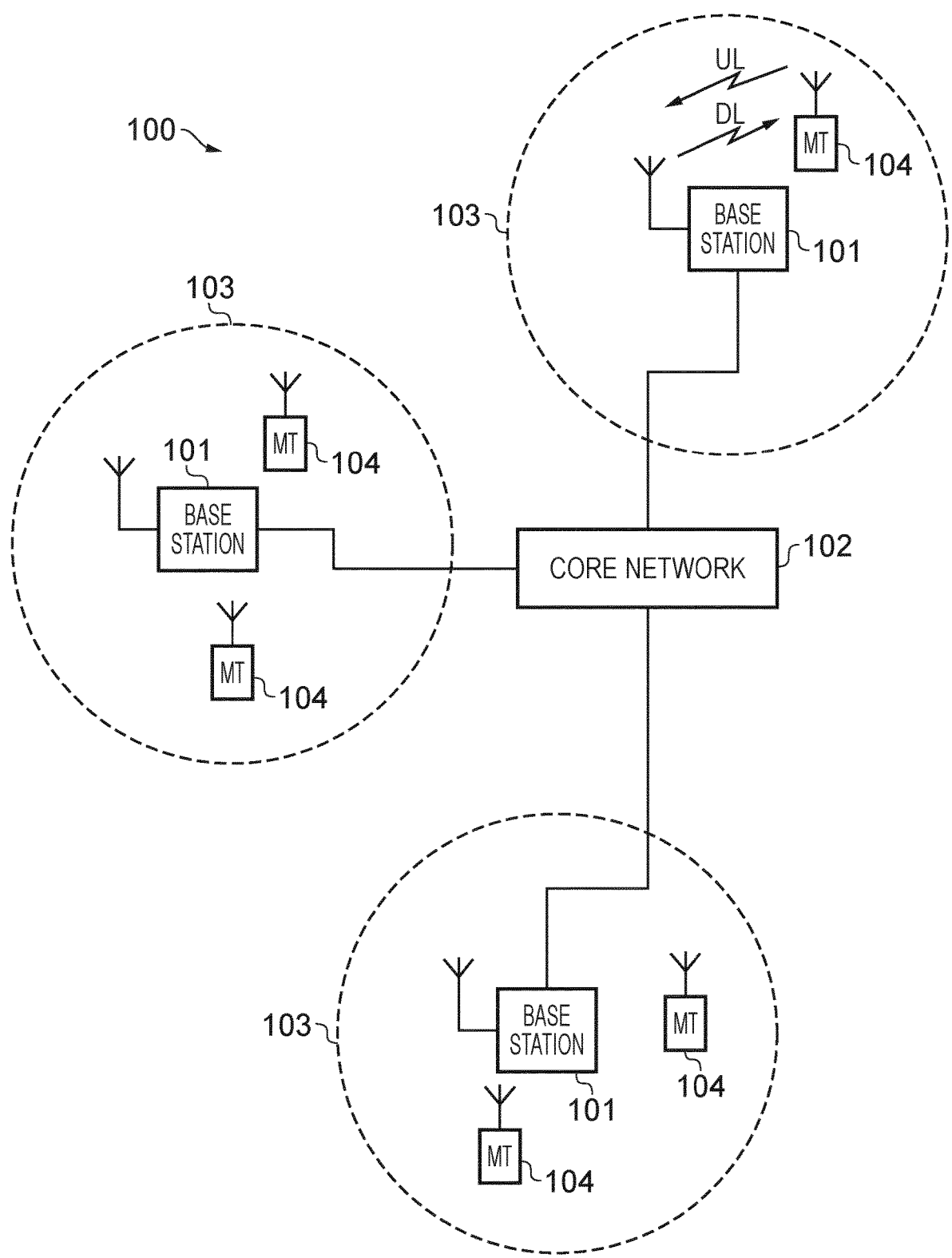
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
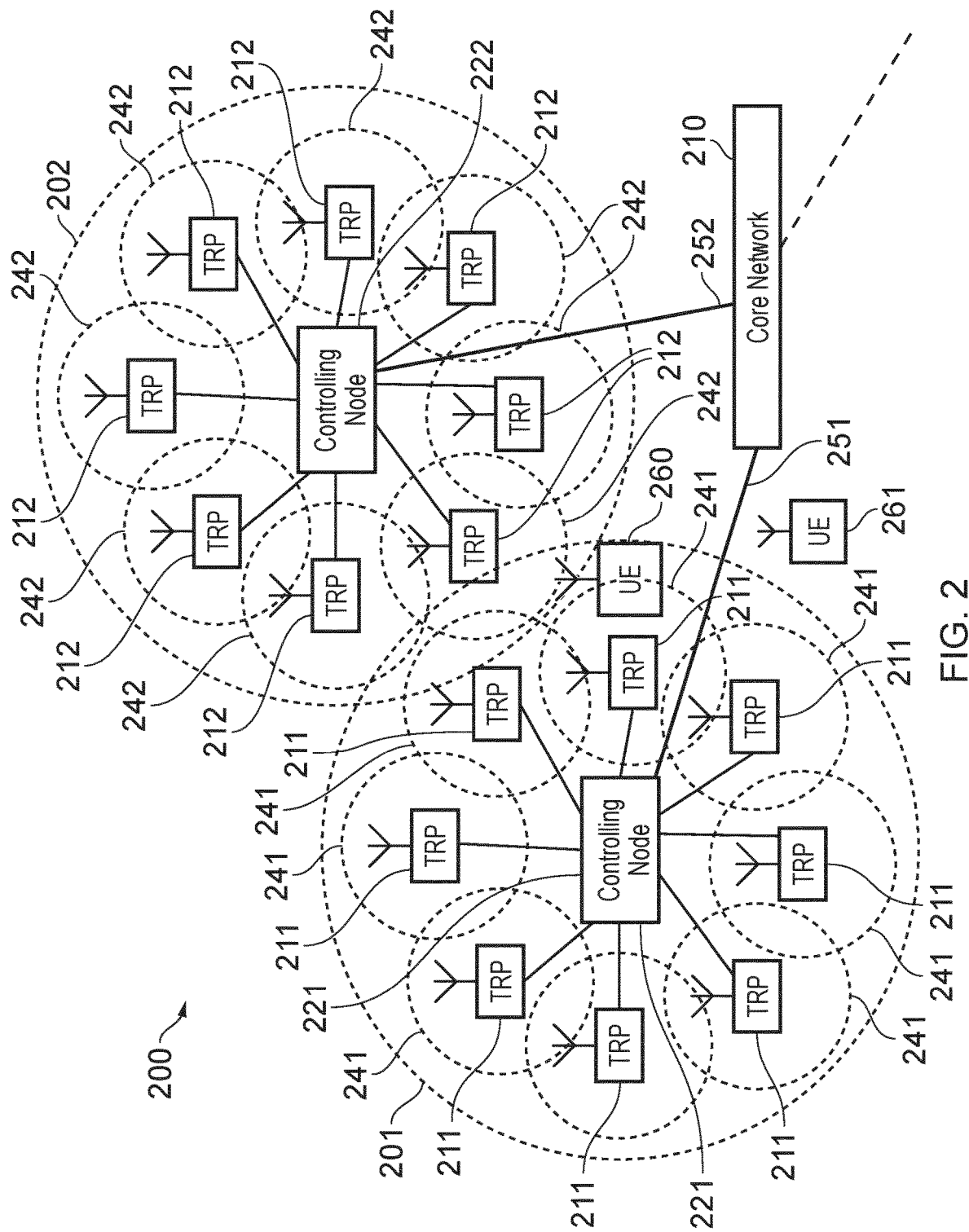
FIG. 2 schematically represents some aspects of a new radio access technology (RAT) wireless communications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A first communications device or UE 260 is represented in FIG. 2 within the coverage area of the first communication cell 201. This wireless communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

A second communications device or UE 261 is also represented in FIG. 2, which is outside the coverage areas of both the first communication cell 201 and the second communication cell 202, and as such does not have direct access to the radio access network (RAN) comprised of the controlling nodes 221, 222 and TRPs 211, 212. However second communications device 261 is within a coverage area of signalling transmitted by first communications device 260.

In the example of FIG. 2, two communication cells 201, 202 and two communications devices 260, 261 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will be appreciated the specific wireless telecommunications architecture in any given implementation is not of primary significance to the principles described herein. Indeed, some embodiments of the disclosure may be implemented by a wireless communications devices without requiring interaction with features of the exemplary radio access networks shown in FIGS. 1 and 2, including but not limited to base stations 101, core networks 102, 210, controlling nodes 221, 222, and TRPs/DUs 211. Thus, although in FIG. 2 the first communications device 260 is shown within coverage of a cell of the wireless communications network and thus can communicate with the DUs 211, and the second communications device 261 is shown as outside of the coverage, the present disclosure is not limited to such scenarios: some embodiments may be implemented when one, both, or neither of the first and second communications devices 260, 261 are within coverage of a wireless communications network.

In embodiments of the disclosure whereby a communications device 260 communicates with infrastructure equipment/access nodes, the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
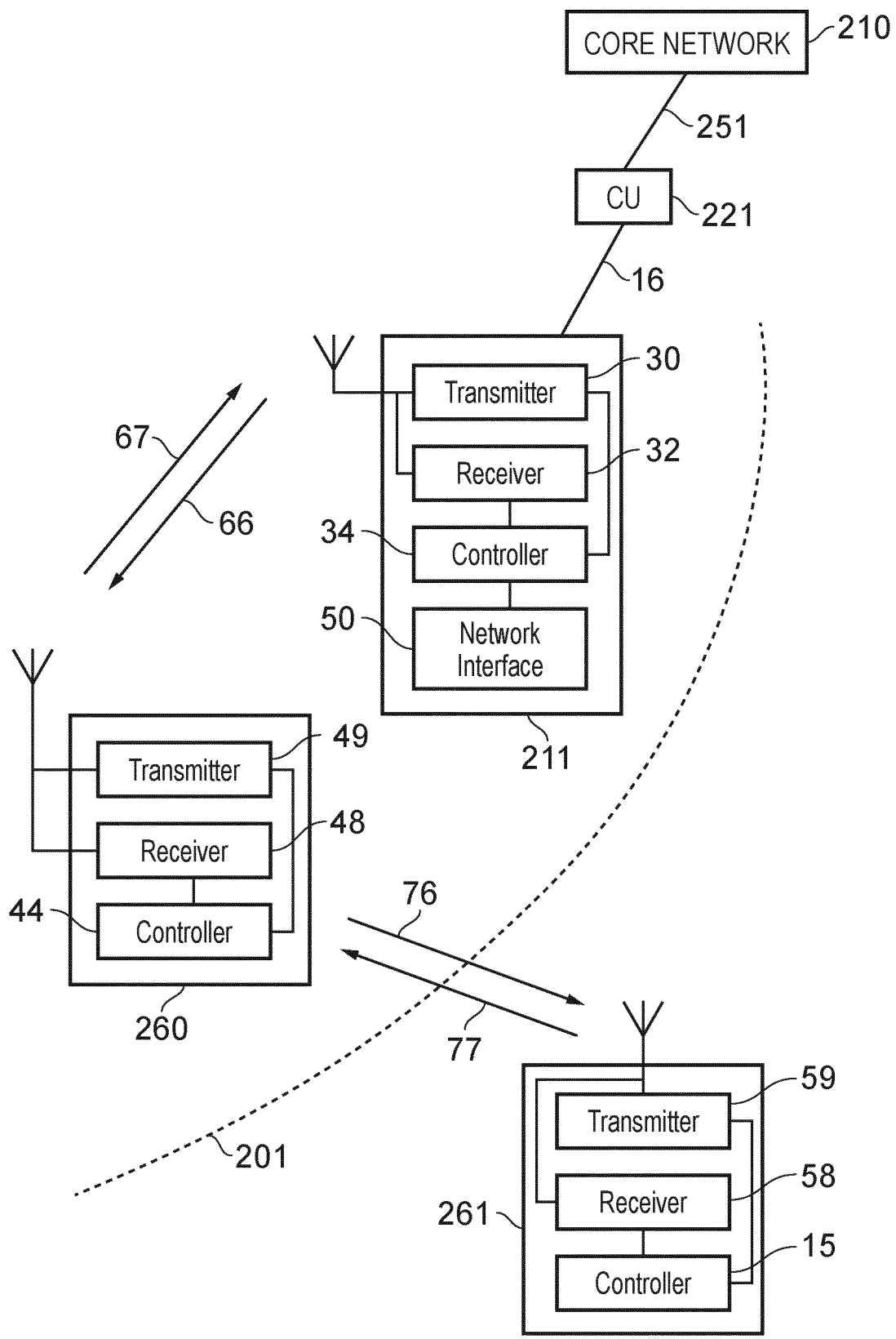
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. The DU 211 comprises, as a simplified representation, a transmitter 30, a receiver 32 and a controller or controlling processor 34 which may operate to control the transmitter 30 and the receiver 32 to transmit and receive radio signals to the first communications device 260 within the first cell 201 via a wireless interface comprising an uplink 67 and downlink 66 portion.

The first communications device 260 is shown to include a corresponding transmitter 49, a receiver 48 and a controller 44 which is configured to control the transmitter 49 and the receiver 48 to transmit signals representing uplink data to the wireless communications network via the wireless access interface 66, 67.

In FIG. 3, the second communications device 261 is shown, which may be substantially identical to or similar to the first communications device 260. The second communications device 261 comprises, as a simplified representation, a transmitter 59, a receiver 58 and a controller or controlling processor 15 which may operate to control the transmitter 59 and the wireless receiver 58 to transmit and receive uplink and downlink radio signals with the first communications device 260 via a sidelink connection 76, 77 using a wireless access interface provided by the first communications device 260. The signals exchanged between the first communications device 260 and the second communications device 261 may comprise sidelink or device-to-device (D2D) communications. It should be appreciated that either of the first and second communications devices 260, 261 shown in FIG. 2 and FIG. 3 may be operable to control their respective transmitters and receivers in this manner to transmit and receive sidelink communications directly with one or more other communications devices and thereby engage in sidelink communications with these other communications devices. The specific protocol used to establish the sidelink connection 76, 77 may be implemented in accordance with different radio access technologies, for instance WLAN, Bluetooth, WiFi, 3G/UMTS, 4G/LTE and 5G/NR. Details of these protocols can be found in the relevant standards. Establishment of a sidelink connection between two or more wireless communications devices may comprise utilising narrowband channels similar to those used in eMTC or NB-IoT.

Where one or both of the first and second communications devices 260, 261 are operating within the coverage of a cell (such as the first cell 201) of a wireless communications network, communications resources used for the sidelink connection 76, 77 may be selected from a pool of resources allocated by the wireless communications network (such as by the DU 211 or the CU 221).

Where neither of the first and second communications devices 260, 261 are operating within the coverage of a cell (such as the first cell 201) of a wireless communications network, the communications resources used for the sidelink connection 76, 77 may be selected from a pre-configured pool of resources.

Thus communications devices, such as the first and second communications devices 260, 261 operating in a wireless telecommunications system are provided with functionality to communicate directly with one another without routing signalling through a RAN associated with one or more wireless communications networks within whose coverage area(s) said communications devices may be located. In some instances, use of sidelink communications allows data to be more efficiently communicated from one communications device to another, because there is no need for the data to be separately transmitted via an uplink of a wireless access interface to an infrastructure equipment (such as the DU 211) and then transmitted again from an infrastructure equipment via a downlink. Sidelink communications may also be advantageously used to support relay communications. With reference to FIG. 3, the second communications device 261, is shown to be outside the cell 201 served by the DU 211. The second communications device 261. Establishment of the sidelink wireless access interface 77, 76 between the first communications device 260 and the second communications device 261 can enable the second communications device 261 to communicate data with the DU 211 (and thus with the rest of the RAN/core network) by using the first communications device 260 as a relay node. For instance, data which is to be transmitted from the second communications device 261 to the DU 211 may be transmitted via an uplink of the sidelink wireless access interface 77 to the first communications device 260, whereupon the first communications device 260 transmits (i.e. 'relays') the data to the DU 211 via the uplink of the wireless access interface 67. Similarly, data which is to be transmitted from the DU 211 to the second communications device 261 may be transmitted using downlink signalling via the downlink of the wireless access interface 66 to the first communications device 260 acting as a relaying node, whereupon the first communications device 260 transmits (i.e. 'relays') the data to the second communications device 261 via the downlink of the wireless access interface 76. In this manner, the second communications device 261 may be served by the DU 211 via the first communications device 260 acting as a relay node. Such a relay node may be provided to enable the second communications device 261 to exchange data associated with any known services generally associated with the core network 210. Additionally or alternatively, the second communications device 261 may transmit or receive data associated with one or more application-layer services provided via further networks connected to the core network 210, for instance, an external packet data network such as the internet.

The transmitters 30, 49, 59 and the receivers 32, 48, 58 (as well as other transmitters, receivers and transceivers described in relation to examples and embodiments of the present disclosure) shown in FIG. 3 may include radio frequency filters and amplifiers as well as signal processing components and devices in order to transmit and receive radio signals in accordance for, example, with the 5G/NR standard. The controllers 34, 44, 54 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the DU 211 also includes a network interface 50 which connects to the CU 221 via a physical interface 16. The network interface 50 therefore provides a communication link for data and signalling traffic from the DU 211 via the CU 221 to the core network 210.

Use of Sidelink Communications

According to conventional operation, in scenarios where both the first and second communications devices 260, 261 are within coverage of the wireless communications network, and are, for example, served by infrastructure equipment associated with the first cell 201 and the second cell 202 of FIG. 2, respectively, the first communications device 260 may initially transmit data to the second wireless communications device 261 in the first cell 201. The data is transmitted to the associated controlling node 221 via one of the distributed units (DU) 211 associated with the first communication cell 201. The data is then transmitted to the second communications device 261 via the appropriate controlling node 221, 222 and/or distributed unit 211. The specific path the signalling takes within the interfaces (e.g. backhaul connections) of the radio access network between the controlling node/TRP receiving the data from the first communications device 260 and the controlling node/TRP transmitting the data to the second communications device 261 can be determined by the network in accordance with any suitable protocol.

However, in some instances, the communications devices 260, 261 are configured to transmit and receive signals representing data directly with other communications devices 260, 261 without routing said signals through network infrastructure equipment/access nodes (e.g. the radio access and/or core networks). Thus in some instances a wireless access interface may be established by the first wireless communications device 260 to support communications with at least one further wireless communications device, such as the second communications device 261. Said communications, which may be referred to as device-to-device (D2D), vehicle-to-vehicle (V2V/V2X), or sidelink communications, are at least partly characterised by not being routed through the entities which form part of the radio access network (e.g. controlling nodes, central units, distributed units, TRPs, transceiver stations, network entities, nodeBs, e-nodeBs, eNB, g-nodeBs, gNB etc) or the core network.

It will be appreciated that aspects of such sidelink communications may be supported by other network entities. For instance, one or more RAN/core entities may effectively reserve communications resources (e.g. within the uplink/downlink radio frame structures associated with one or more cells under the control of the RAN/core network) which can be used for direct communications between the first and second communications devices 260, 261. Network-assisted coordination may thus avoid potential issues with interference. For example, if the first communications device 260 within a coverage area of the first cell 201 attempts to exchange signalling with the second communications device 261 then sidelink transmissions may interfere with uplink or downlink transmissions in the first cell 201 using the wireless access interface provided by the DU 211 in accordance with one or more wireless access interfaces provided by the RAN entities. Such interference may be reduced or avoided if sidelink transmissions are confined to the reserved communications resources, which are not otherwise used for transmissions within the first cell 201.

Sidelink communications between communications devices may also be assisted by one or more RAN/core network entities by the provision of signalling which can assist synchronisation between the two or more communications devices 260, 261 before or during establishment of a sidelink connection. For instance, two communications devices which are within a same cell may attain synchronisation with a network entity such as the DU 211 by receiving reference signalling on downlink radio resources, and may therefore be accordingly synchronised with one another. This may enable two communications devices which are seeking to establish a sidelink connection to forego some aspects of a discovery and synchronisation procedure which might otherwise be required to establish a wireless access interface to support device-to-device communications.

It will also be appreciated that sidelink communications may be established between two or more communications devices without direct assistance from the RAN/core of a wireless communications system such as those shown in FIGS. 1 and 2. In these instances, two wireless communications devices may establish a sidelink connection according to a discovery and connection procedure which may be similar to the conventional RRC connection procedures used to establish a connection between the communications device 260 and a base station/TRP/controlling node or other cell-serving entity familiar to conventional LTE or 5G contexts. In some instances, sidelink communications may be established on unlicensed spectrum resources which are not under the control of the RAN. Use of these resources by wireless communications devices may be on an opportunistic basis, and may employ a listen-before-talk (LBT) protocol to support coexistence with other entities seeking to transmit signals on the same resources. For example it has been proposed in document R2-133840 [2] to use a Carrier Sense Multiple Access, CSMA, approach to provide a degree of co-ordination for sidelink transmissions by wireless communications devices through contention-based scheduling by each device. In effect each wireless communications device first listens to identify which resources are currently being used, and then schedules its own transmissions on unused resources.

In many examples, a sidelink connection will be used to provide exchange of data between two or more UEs which are mobile with respect to one another. This may be used in contexts such as vehicle-to-vehicle (V2V), vehicle-to-everything (V2X) and wider device-to-device (D2D) scenarios for the sharing of, for example, traffic information, safety-related information, and data from application layer services. Sidelink connections may also be used to provide relaying services, enabling a UE or communications device outside the coverage of a network to access the network via an intermediate connection to a ('relay') UE which is within the coverage of a cell of the wireless communications network and thus has access to a wireless access interface provided by the radio access network of the wireless communications network.

In some scenarios, such as V2V and V2X contexts, UEs may move quite rapidly in and out of signalling range of one another. Thus it is to be expected that a sidelink connection between a first UE and a second UE may become unsuitable for supporting communications between the UEs.

Embodiments of the present technique provide a method of operating a first wireless communications device for communicating with a second wireless communications device, the method comprising establishing a configuration for exchanging signalling with the second wireless communications device over a wireless interface, and receiving a handover command from the second wireless communications device over the wireless interface, indicating that the first wireless communications device should modify an aspect of a current configuration used for wireless communication. The method further comprises providing the second wireless communications device with a handover reject indication, wherein the handover reject indication indicates to the second wireless communications device that the first wireless communications device is to continue to operate in accordance with its current configuration used for wireless communication. The first wireless communications device continues to operate in the manner indicated by the handover command.

Embodiments of the present technique therefore provide for an improved handover procedure for sidelink communications, in which a communications device which is a recipient of a handover command may determine not to adapt its communications in accordance with the handover command. Embodiments also provide for preferences, capabilities and/or measurements associated with a peer communications device to be taken into account in selecting a new configuration for the sidelink communications. In particular, radio resources which may be determined as being suitable by one of the peer communications devices may be determined by the other of the peer communications devices as unsuitable, or less preferable than other radio resources.

Conventional Network-Controlled Handover

Figure 4:
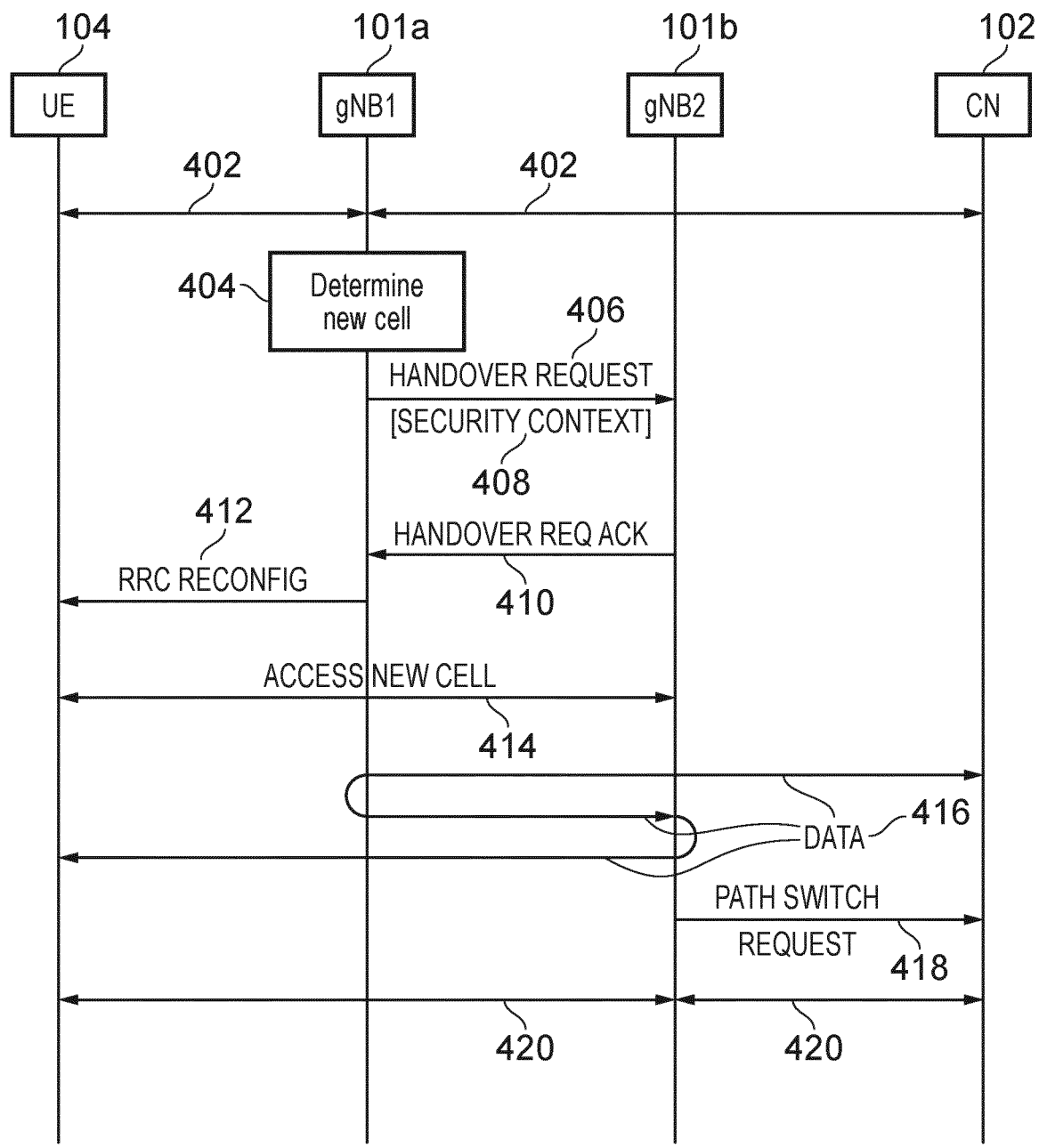
FIG. 4 is a ladder diagram representing some aspects of an example wireless communications device handover scenario which may be used in accordance with wireless telecommunication systems as shown in FIGS. 1 and 2.

Aspects of a conventional handover process are illustrated in FIG. 4.

Initially, the communications device 104 (which may correspond to the communications device 260 of FIG. 3) is being served in the first cell 201 associated with a source infrastructure equipment 101a which may be a first infrastructure equipment corresponding to the DU 211. Data 402 is transmitted to or from the core network 102 from or to the communications device 104, via the source infrastructure equipment 101a.

The source infrastructure equipment 101a determines in process 404 that the communications device 104 should, in future, be served in a different cell. This determination may be based on measurements on signals transmitted by the communications device 101 and received at the first infrastructure equipment 101a, and/or based on measurement reports transmitted by the communications device 101. The measurement reports may comprise indications of the results of measurements performed by the communications device 101 on signals transmitted by the first infrastructure equipment 101a, and/or of measurements performed by the communications device 101 on signals transmitted by the other infrastructure equipment, such as the second infrastructure equipment 101b (which may correspond to the DU 222 of FIG. 3).

It will be appreciated that the determination that a handover should occur may be made based on other factors in accordance with various algorithms. The scope of the present disclosure is not limited to any particular method of determining that a handover is to be carried out.

In response to the determination 404, the source infrastructure equipment 101a selects a candidate cell. This selection may be based on the measurement reports transmitted by the communications device 104. In the example of FIG. 4, the source infrastructure equipment 101a selects the second cell, associated with the second infrastructure equipment 101b.

Accordingly, the source infrastructure equipment 101a may initiate a handover procedure with the target infrastructure equipment 101b. In the example of FIG. 4, the source infrastructure equipment 101a and the target infrastructure equipment 101b are directly connected (such as by an X2 or Xn inter-infrastructure equipment connection), however in some examples, the handover procedure may comprise signalling transmitted via, but not involving, the core network 102 (which may correspond to the core network 210 of FIG. 3).The handover preparation may thus occur without specific interaction with the core network 102.

As part of the handover preparation, the source infrastructure equipment 101a transmits a handover request 406 to the target infrastructure equipment 101b to allocate communications resources in the new cell for the communications device 104. In response, the target infrastructure equipment 101b transmits to the source infrastructure equipment 101a a handover request acknowledge message 410, containing parameters for the use of the communications device 104 in the new cell. The parameters may include communications resources, identity, and configuration parameters to be used by the communications device 104 in the target cell. The parameters are forwarded to the communications device 104, in an RRC reconfiguration message 412.

In response to receiving the RRC reconfiguration message 412, the communications device 104 accesses the new cell, for example using a random access procedure 414.

In the example of FIG. 4, at this stage, entities in the core network 102 are not aware that the serving cell of the communications device 104 has changed, and data 416 received from the core network 102 for onward transmission to the communications device 104 by the source infrastructure is forwarded to the target infrastructure equipment 101b.

In order to notify the core network 102 of the change of serving cell (and, more particularly, of serving infrastructure equipment), the target infrastructure equipment 101b may send a Path Switch Request message 418 to the core network 102, in response to which, the core network 102 subsequently transmits data 420 for the communications device 104 to the target infrastructure equipment 101b instead of the source infrastructure equipment 101a.

As will be understood from the preceding description, in a conventional wireless telecommunication network, handover decisions are made solely by entities within the RAN/core network (e.g. controlling nodes, base stations, infrastructure equipment), and not by communications devices themselves. As discussed in respect of the process of FIG. 4, the source infrastructure equipment 101a associated with the current active cell (i.e. the first cell 201), having determined that the communications device 104 should be handed over to the second cell 202, informs the communications device 104 that it is being handed over to the second cell 202.

Accordingly, the involvement of the communications device 104 in the procedure is limited to transmitting/receiving signalling associated with making measurements which support the decision, taken by an entity within the RAN/core network (e.g. source infrastructure equipment 101a), about the most suitable target cell for the handover. The source infrastructure equipment 101a, having configured the target infrastructure equipment 101b for the handover to the second cell 202, informs the communications device 104 of the handover, provides any necessary configuration information for the communications device 104 to access the second cell 202, and then instructs the communications device 104 to perform the handover.

This conventional handover scenario may be considered a master/slave arrangement, in that one or more entities in a RAN/core network make a unilateral decision about a handover of a communications device, and a communications device simply respond to handover indications in the manner indicated. According to these conventional scenarios, a communications device, having been provided with a handover indication, proceeds to modify its wireless communications (by, for example, reconfiguring the radio resources used for upcoming communications, and/or connecting to a different network entity).

This form of master/slave approach may be considered appropriate in the context of handovers of a communications device between cells/radio resources under the control of a host network, such as in the conventional LTE/NR scenarios represented schematically in FIGS. 1 and 2. An advantage of the approach is that in most instances the host network will have a much wider overview of radio conditions and mobility scenarios within its geographical coverage area than any individual communications device, and may be considered to be better placed than any individual communications device to make decisions on handover configurations.

However, the inventors of the present techniques disclosed herein have identified issues which may arise if this form of conventional handover procedure is applied to handovers in contexts where communications devices are communicating with one another directly via sidelink communications.

In peer-to-peer communication scenarios as described further herein, whereby a first communications device is communicating with a second communications device via a sidelink (e.g. in a D2D, V2V, V2X scenario), the first communications device may determine that it is appropriate for upcoming communications with the second communications device to use different radio resources, and/or for communications with the second communications device to be via a further communications device.

Embodiments of the present technique provide a method of operating a first wireless communications device to communicate with a second wireless communications device, the method comprising transmitting or receiving signals representing data to or from the second wireless communications device over a wireless interface, the signals being transmitted or received by the second wireless communications device in accordance with a current configuration, determining that the current configuration is to be changed to a new configuration, transmitting a handover command to the second wireless communications device over the wireless interface, the handover command comprising an indication of the new configuration to replace the current configuration, and receiving via the wireless interface a handover reject indication from the second wireless communications device, the handover reject indication indicating to the first wireless communications device that the second wireless communications device is to continue to operate in accordance with the current configuration.

Embodiments of the present technique provide for a handover procedure for modifying a configuration of a communications device used for the transmission of signals via a sidelink connection with another communications device.

Figure 5:
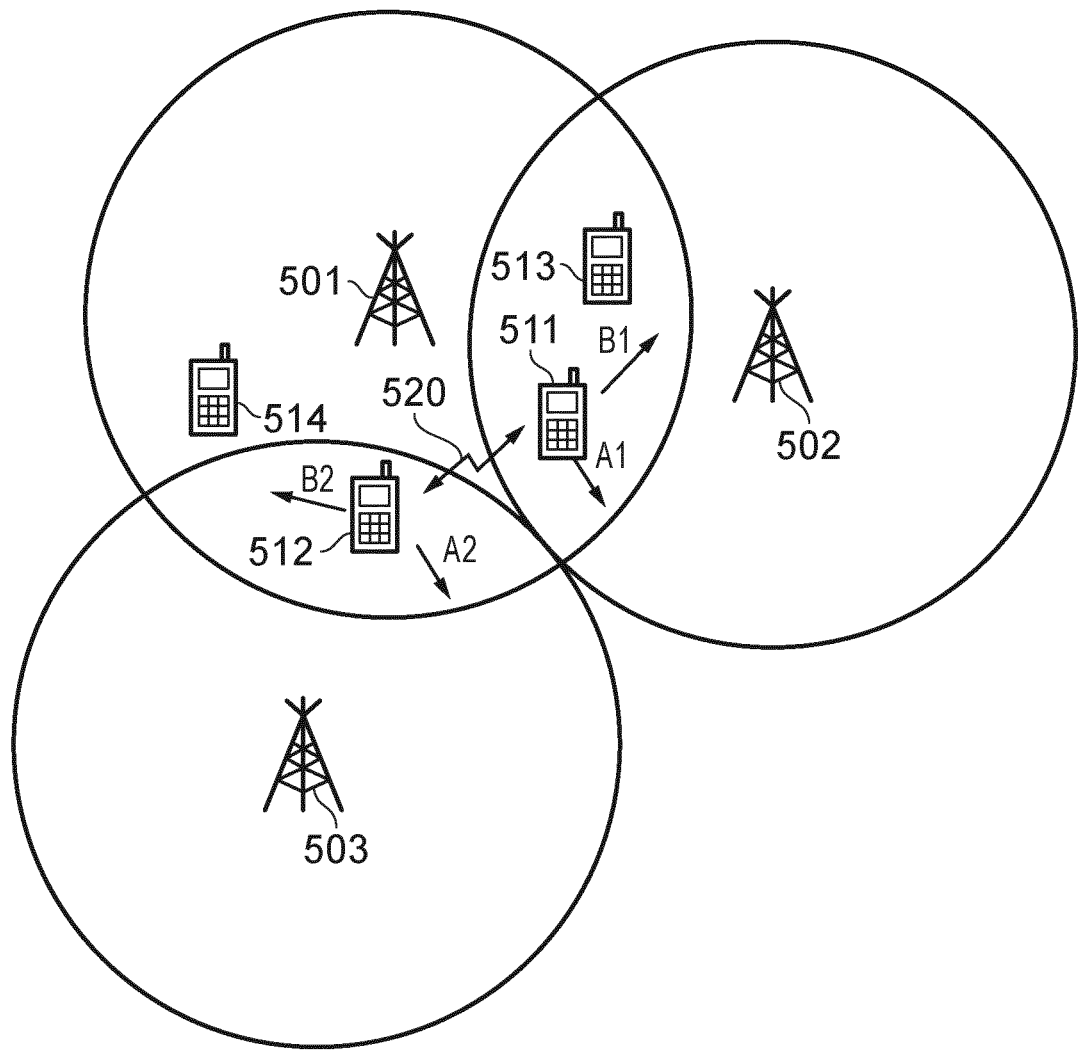
FIG. 5 schematically represents some aspects of a wireless telecommunication system in which at least two wireless communications devices are configured to communicate with one another via a sidelink connection.

FIG. 5 is a schematic diagram illustrating a peer-to-peer handover scenario in which approaches according to embodiments of the present disclosure can be applied. FIG. 5 shows four communications devices 511, 512, 513, 514, which may be configured for operation in the manner set out herein in respect of communications device 104 shown in FIG. 1, and communications devices 260, 261 shown in FIG. 2 and FIG. 3. Accordingly, communications devices 511, 512, 513, 514 are able to establish sidelink connections provided they are within range and the prevailing radio conditions are suitable. In other words, a first communications device is configured to discover and establish a sidelink RRC connection with a second communications device via a sidelink wireless access interface in the manner described herein in respect of the first and second communications devices 260, 261 shown in FIG. 3. Communications devices 511, 512, 513, 514 may comprise mobile communications devices, for instance, communications device 512 and communications device 513 may be implemented within a mobile phone and/or a vehicle and/or a personal computing device such as a laptop or tablet. In some embodiments, one or more of communications devices 511, 512, 513, 514 comprise vehicles.

Also shown in FIG. 5 are first to third cells, 501, 502, 503, which may be implemented in accordance with technologies described herein for providing a wireless access interface. For instance, any of the first to third cells 501, 502, 503 may comprise a cell 101 served by an base station as shown in FIG. 1, or a cell 201, 202 served by controlling nodes 222, 221 and/or TRPs 211, 212 as shown in FIG. 2. In some embodiments, first to third cells 501, 502, 503 may be configured according to UTRAN, WLAN, Bluetooth, WiFi, 3G, LTE and 5G. In other embodiments, first to third cells 501, 502, 503 may not exist, and communications devices

511, 512, 513, 514 may be considered to be out of coverage of any other wireless network infrastructure.

In FIG. 5, first and second communications devices 511, 512 have established a configuration for exchanging signalling over a sidelink wireless access interface 520, enabling direct signalling exchange. It will be appreciated that in some scenarios the first communications device 511 may be transmitting data without receiving data from the second communications device 512. The sidelink connection 520 may have been established in accordance with any conventional approach for device discovery and RRC connection suitable for use between communications devices, such as described in [3]. The specific implementation of this process will depend upon the technology used to support the wireless access interface between the UEs in a specific implementation. In some instances, the procedure for establishing the initial sidelink connection between the first communications device 512 and the first communications device 511 may be identical to or analogous to an RRC connection signalling procedure used by a UE to connect to a cell in a conventional LTE/5G/NR scenario.

In some examples, beacon signalling transmitted by one or both of the first and second communications devices 511 and 512 may be used to support device discovery, and synchronisation signalling such as device-to-device synchronisation signals (D2DSS) may be transmitted by the first and second communications devices 512 and 511 to support synchronisation. The signalling exchanged on the sidelink connection between the first and second wireless communications devices 511, 512 is transmitted on radio resources which may be associated with a particular frequency range. The frequency range may be within a frequency band used by the RAN of a network (e.g. a band used to support communications on any of the cells 501, 502, 503), or within an unlicensed frequency band.

According to a first example scenario, the first and second communications devices 511 and 512 are moving in directions indicated by the respective arrows A1 and A2 in FIG. 5. At some stage, the first communications device 511 determines that an aspect of a current configuration used by the second communications device 512 for wireless communication should be modified. In some embodiments, this comprises determining that the radio resources currently being used to support the sidelink communication should be changed. This could be, for example, because radio conditions on the wireless access interface supporting the sidelink 520 are worsening due to mobility and/or fluctuating radio conditions related to environmental factors or the influence of contemporaneous transmissions made by other devices in the radio environment. In the example of FIG. 5, as the first and second communications device 511 and 512 travel in the directions indicated by respective arrows A1 and A2, transmissions associated with the second cell 502 may be causing worsening interference on the sidelink between the first and second communications device 511 and 512.

Thus in the present scenario, the first communications device 511 determines (for instance using approaches such as those described in respect of the first cell 201 in the process illustrated in FIG. 4) that upcoming signalling to be exchanged with the second communications device 512 should be transferred to different radio resources. Thus the first communications device 511 identifies, for instance using conventional measurement approaches, a target set of radio resources which it deems suitable to support upcoming signalling between the first and second communications devices 511, 512. These target resources could comprise resources within a frequency band used for communication by one or more of the first to third cells 501, 502 and 503, or could comprise resources within an unlicensed frequency band.

In accordance with embodiments of the disclosure, the first communications device 511 transmits a handover command to the second communications device 512 over the sidelink wireless interface 520, indicating that the second communications device 512 should modify an aspect of a current configuration for wireless communication. In the current scenario the handover command transmitted to the second communications device 512 comprises an indication of a target set of radio resources to be used by the second communications device 512 for exchanging upcoming signalling with at least one other communications device. As set out further herein, the other communications device may be a further device such as third or fourth communications devices 513, 514 shown schematically in FIG. 5. However in many instances, the other communications device will be the first communications device 511 which transmits the handover command.

In some embodiments, the signalling comprising the handover command is transmitted over the sidelink 520. In some embodiments, the handover command may be routed through other network entities (e.g. a RAN of the kind shown schematically in FIGS. 1 and 2). This signalling may be termed a handover command, and can be considered an indication that the first communications device 511 intends to switch upcoming signalling between the first and second communications devices 511, 512 to different time and/or frequency resources. The handover command may be implemented in a form identical to or analogous to an RRC Connection Reconfiguration message (e.g. corresponding to the handover indication 412 transmitted in the first cell 201 in the process illustrated in FIG. 4). In some situations, the second communications device 512, upon receiving the handover command, may reconfigure its communications with the first communications device 511 such that it transmits/receives upcoming signalling on the target radio resources indicated by the handover command.

However, in accordance with embodiments of the present technique, in some situations the second communications device 512 may determine not to modify its communication with the first communications device 511 in the manner indicated by the handover command. For example, in one exemplary scenario shown in FIG. 5, the second communications device 512 may be experiencing interference on the target radio resources indicated by the handover command due to its proximity to the third cell 503.

This is in contrast to a conventional handover scenario such as that shown in FIG. 4, wherein a communications device receiving a handover command is required to respect the handover command and modify its configuration accordingly.

Techniques disclosed herein can therefore provide an improved handover procedure for sidelink communications, since, for example, changing a configuration for upcoming signalling to use the target radio resources, which may suffer from interference, can be avoided.

According to a second scenario shown in FIG. 5, the first and second communications devices 511 and 512 have an established sidelink 520 as previously described, and are moving in directions indicated by respective arrows B1 and B2. In this scenario is that the first communications device 511 with a current sidelink connection 520 to the second communications device 512 determines that the second communications device 512 should exchange upcoming signalling with further network entity. For example, the first communications device 511 may be transmitting to the second communications device 512 data from an application layer service and determines that another communications device or cell-serving entity (such as infrastructure equipment associated with one of the first to third cells 501-503) may be more suitable for serving future transmissions of data to the second communications device 512. This could be due to mobility (for example because the first and second communications devices 511 and 512 are moving out of range of one another due to their movement in respective directions B1 and B2) or application layer changes (for example the first communications device 511 is no longer able to provide access to an application layer service required by the second communications device 512) or because the first communications device 511 wants to retune its transceiver to a different frequency band.

In some instances the first communications device 511 may have been acting as a relay node to provide a communications channel between the second communications device 512 and infrastructure associated with the second cell 502 according to an approach such as that set out herein with reference to FIG. 3. In such a scenario, the first communications device 511 may itself be moving out of coverage of the second cell 502, and thus determine that it will no longer be able to provide a relay service to the second communications device 512. However, these scenarios are exemplary, and it will be appreciated there are many potential reasons why the first communications device 511 might determine that the second communications device 512 should modify an aspect of a current configuration for wireless communication to exchange data with another wireless communications device.

In some instances the second communications device 512 may have been acting as a relay node to provide a communications channel between the first communications device 511 and infrastructure associated with the second cell 502. The second communications device 512 may additionally be acting as a relay node in respect of one or more additional communications devices.

According to some embodiments of the disclosure, the determination by the first communications device 511 that an aspect of a current configuration used by the second communications device 512 for wireless communication should be modified does not entail modifying the sidelink 520 between the first and second communications devices 511 and 512, but rather comprises determining that the first communications device 511 should seek to establish a new connection or modify an existing connection to a further communications device /cell.

Thus according to embodiments of the disclosure, the first communications device 511 identifies, for instance using conventional discovery and/or measurement approaches, one or more target communications devices with which the second communications device 512 is to exchange upcoming signalling. For instance the first communications device 511 may use appropriate techniques to determine a target communications device with which the second communications device 512 is to exchange upcoming signalling. The procedures used to determine the capabilities of neighbouring cells/communications devices, and thus determine their suitability for exchanging signalling with the second communications device 512 may be in accordance with approaches described elsewhere herein or conventional approaches known in the field of D2D, V2V communications.

In accordance with embodiments of the disclosure, the first communications device 511 transmits a handover command to the second communications device 512 over the wireless interface 520, indicating that the second communications device 512 should modify an aspect of a current configuration for wireless communication. This command may broadly correspond to a handover indication 412 as described in respect of FIG. 4. In the current example scenario the handover command transmitted to the second communications device 512 comprises an indication of a target communications device with which the second communications device 512 is to exchange upcoming signalling (e.g. establish a sidelink connection). As set out further herein, the target communications device may be the third or fourth communications device 513, 514 as shown schematically in FIG. 5, or infrastructure equipment forming a cell as part of a RAN such as the first to third cells 501, 502, 503 shown schematically in FIG. 5.

In an example scenario, in accordance with embodiment of the present technique, the first communications device 511 may indicate that the third communications device 513 is the target communications device. That is, the handover command indicates that the second communications device 512 is to modify its configuration so as to communicate directly with the third communications device 513. Communications between the first and second communications devices 511, 512 may accordingly subsequently be by means of data which is relayed by the third communications device 513.

However, according to this example scenario, the second communications device 512 is moving in direction B2 and thus moving away from the target third communications device 513. The second communications device 512 thus determines that the target third communications device 513 is an unsuitable candidate with which to exchange upcoming signalling. For instance, second communications device 512 may be out of range of the target third communications device 513, or second communications device 512 may determine that it and the target third communications device 513 may not be able to exchange signalling due to incompatibility in their associated circuitry/radio access configurations.

It will be appreciated there may be many reasons why second communications device 512 does not want to, or is unable to, exchange upcoming signalling with the target third communications device 513. However, according to a conventional handover scenario such as that shown in FIG. 4, and wherein the first communications device 511 effectively plays the role of a serving infrastructure equipment corresponding to a current serving cell, the second communications device 512 would be required to comply with the handover command. In the present example, the result of such compliance may be that the second communications device 512 and the third communications device 513 fail to establish a sidelink, or establish a sub-optimal sidelink in terms of radio quality or some other relevant parameter.

Thus FIG. 5 has set out two exemplary scenarios in which a conventional handover approach in accordance with one or more of the principles used in a handover of the kind set out in FIG. 4 may be inappropriate or lead to a suboptimal selection of radio resources and/or a target communications device to be used by a given communications device for sidelink communications in a peer-to-peer communication context such as a D2D, V2V or V2X scenario.

Figure 6:
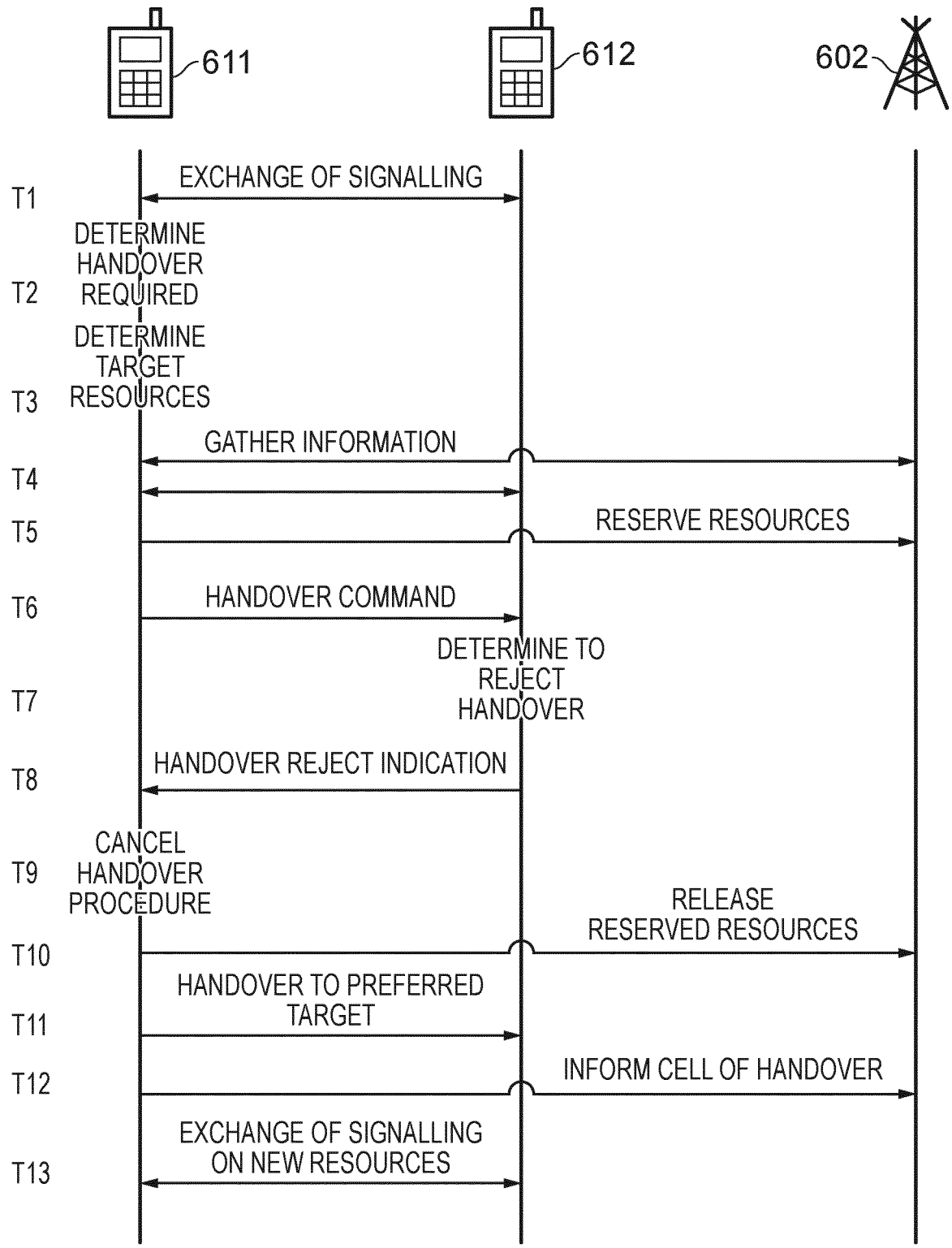
FIG. 6 is a ladder diagram representing some aspects of a wireless communications device handover scenario which may be used in accordance with embodiments of the present disclosure.

FIG. 6 is a ladder diagram schematically representing aspects of an approach in accordance with some embodiments of the present disclosure. In particular, the diagram represents operations and signalling exchange associated with first and second communications devices 611, 612

(which can be considered to correspond to the first and second communications devices 511, 512 shown schematically in FIG. 5). Also shown is infrastructure equipment 602, providing a wireless access interface in a cell which may be established in accordance with the LTE/NR technologies described further herein. In accordance with some embodiments of the disclosure, the infrastructure equipment 602 may be configured to exchange signalling with one or both of first and second wireless communications devices 611, 612.

The processing represented in FIG. 6 starts in step T1 in which it is assumed that the first wireless communications device 611 has established a configuration for exchanging signalling with the second communications device 612 over a sidelink wireless interface. The first and second wireless communications devices 611, 612 are therefore configured to exchange data directly with one another over a sidelink connection. This sidelink may have been configured and established according to any of the principles set out further herein or known in the relevant art for establishing a wireless interface between two communications devices.

In step T2, the first communications device 611 determines that an aspect of a current configuration used by the second communications device 612 for wireless communication should be modified. The determination may be based on one or more factors related to mobility, radio channel quality, provision of relaying services, provision of application layer services and the like.

Specifically, in some embodiments, the determination may be based on measurements by the first communications device 611 of the sidelink radio link between the first and second communications devices 611, 612. The measurements may be of packet loss rate, received signal strength, received signal quality and/or bit error rate. The determination may comprise determining that handover criteria based on the sidelink radio link are satisfied.

In some embodiments, at step T1 the first communications device 611 provides data from an application layer service to the second communications device 612. The determination at step T2 may comprise determining that the first communications device 611 is no longer able to provide such data (for example, because it obtains the data from another device to which it no longer has connectivity either via another sidelink or via infrastructure equipment associated with a wireless communications network).

In some embodiments, the determination may be based on one or more measurement report indications transmitted by the second communications device 612 to the first communications device 611. The measurement report indications may comprise indications of results of measurements carried by the second communications device 612 of the sidelink radio link between the first and second communications devices 611, 612. The measurements may be of packet loss rate, received signal strength, received signal quality and/or bit error rate. The determination may comprise determining that handover criteria based on the sidelink radio link, as measured by the second communications device 612, are satisfied.

In some embodiments, the determination may be based on pre-determined preferences for operating using a particular frequency band or bands. For example, the first communications device 611 may be configured in accordance with pre-determined preferences, to prefer operation using a particular unlicensed frequency band, in preference to the frequency band used for the sidelink connection in step T1.

It will be appreciated that the handover determination at step T2 may be based on a combination of criteria, and may include other criteria in addition to, or alternatively to those specifically described herein.

In step T3, the first communications device 611 determines a target set of radio resources to be used by the second communications device 612 for exchanging upcoming signalling with at least one other communications device. The at least one other communications device may be the first communications device 611, an infrastructure equipment of a radio access network (such as infrastructure equipment 602), or another mobile communications device (not shown).

In the example of FIG. 6, the infrastructure equipment 602 forms a wireless access interface providing service within a cell. The first communications device 611 is located within the cell and accordingly can communicate with the infrastructure equipment 602.

As set out further herein, these resources may be determined by any suitable approach. For instance, the first communications device 611 may make measurements of channel conditions on candidate resources within one or more frequency bands, and determine that a certain set of radio resources appear suitable for supporting upcoming signalling between the second communications device 612 and the at least one other communications device. As shown in optional step T4, the first communications device 611 may exchange signalling with another entity, such as the second communications device 612 or the infrastructure equipment 602 to receive information which can be used by the first communications device 611 to determine a set of target radio resources.

In an optional step T5, the first communications device 611 may exchange signalling with the infrastructure equipment 602 requesting that radio resources corresponding to the target set of radio resources are reserved in the cell. This signalling may be referred to as a resource reserve request. According to some embodiments, the reserving of radio resources by the infrastructure equipment 602 comprises refraining from scheduling future transmission on a set of radio resources (e.g. within a radio subframe structure used to provide a wireless access interface) which overlap with the target radio resources, so that an upcoming exchange of signalling between the second communications device 612 and the at least one other communications device using the target radio resources does not experience interference from scheduled transmissions within the cell controlled by the infrastructure equipment 602.

In some embodiments, as part of the exchange of signalling used to reserve radio resources within the cell, a timer may be established to control when the reserved resources can be released (that is, may be used without restriction) in the cell. Accordingly, if the reserved resources are not used for any exchange of signalling involving the second communications device 612 before the expiry of the timer, the infrastructure equipment 602 will release the reserved resources. This releasing may comprise enabling the resources to be scheduled for transmissions associated with the operation of the cell. Though step T5 has been explained with reference to the infrastructure equipment 602 and the corresponding cell, it will be appreciated that the first communications device 611 may request a reservation of radio resources by other entities (for example other communications devices) in order to support upcoming signalling between the second communications device 612 and the at least one other communications device on the target radio resources indicated by a handover command.

In step T6, the first communications device 611 transmits the handover command to the second communications device 612, indicating that the second communications device 612 should modify an aspect of a current configuration for wireless communication. This handover command may comprise an RRC Reconfiguration message, indicating the target set of radio resources determined by the first communications device 611 in step T3 and potentially reserved by a further network entity such as the infrastructure equipment 602 in optional step T5. The signalling comprising the handover command may be transmitted over the sidelink between the first and second communications devices 611 and 612, or may be routed through other network entities, for example, via exchange of signalling between each of the first and second communications devices 611 and 612 and the infrastructure equipment 602.

In step T7, the second communications device 612, in response to receiving the handover command, determines that it will continue to operate using the current configuration, and/or that it will not modify its current configuration used for wireless communication in accordance with the handover command.

For instance, the second communications device 612 may determine that the target set of radio resources indicated by the handover command is unsuitable for use, for example, due to interference on said resources as determined via measurements made by the second communications device 612. The target set of resources may additionally or alternatively be determined to be unsuitable because they are within a frequency band on which the second communications device 612 is unable to transmit or receive. For instance, the target set of resources may be within an unlicensed frequency band which the second communications device 612 is not configured to use for transmission or reception of signals.

Where the second communications device 612 is acting as a relay node to provide a communications channel between the first communications device 611 and infrastructure associated with a cell and, in some examples, also acting as relay node for one or more further communications devices, the second communications device 612 may determine that the target set of radio resources indicated by the handover command is unsuitable for use based on requirements associated with providing the relay functionality in respect of the first communications device 611 and/or the one or more further communications devices. For example, the second communications device 612 may determine that the target set of radio resources indicated by the handover command is unsuitable for use because they are insufficient to permit the continuing functionality as a relay device.

Additionally or alternatively, the second communications device 612 may determine that the target set of resources is subject to 'listen-before-talk' transmission requirements (such as in accordance with a carrier sense multiple access, CSMA, protocol), which may preclude communications between the first and second communications devices 611, 612. For example, the second communications device 612 may have detected frequent transmissions using some or all of the target set of resources which, according to the listen-before-talk protocol, would prevent one or both of the first and second communications devices 611, 612 from transmitting using the target set of resources, and/or would significantly reduce the available data rate that could be achieved using the target resources for a sidelink connection.

In some embodiments, additionally or alternatively, the second communications device 612 may determine a more suitable or more preferable set of radio resources for use for exchanging upcoming signalling. In some embodiments, in response to receiving the handover command in step T6 the second communications device 612 may determine a preferred target set of radio resources which is determined to be a more suitable candidate for use for exchanging upcoming signalling with the at least one other communications device than the target set of radio resources indicated by the handover command received from the first communications device 611. The procedure used to determine the preferred target set of radio resources is not significant, and may follow any of the approaches set out further herein (for example as described above in respect to the first communications device 611 in steps T3 and T4), or others known for determining suitable radio resources known in the art.

Accordingly, the determination at step T7 that the second communications device 612 will not modify its current configuration used for wireless communication in accordance with the handover command may be in response to an identification of alternative, more preferable radio resources.

In some embodiments, the determination not to change to the new configuration is in response to one or more of:
  determination that the proposed radio resources are not suitable (for example, due to interference, listen-before-talk requirements, application level preferences, pre-configured preferences and/or respective device capabilities),
  identification of alternative, preferred radio resources, and
  identification of an alternative communications device for establishing a sidelink connection.

In step T8, in response to determining that the second communications device 612 will not modify its current configuration used for wireless communication in accordance with the handover command, the second communications device 612 transmits to the first communications device a handover reject indication. The handover reject indication indicates to the first communications device 611 that the second communications device the second communications device 612 does not intend to modify its current configuration used for wireless communication in the manner indicated by the handover command and will continue to operate using the current configuration.

It will be appreciated this aspect of the peer-to-peer handover procedure illustrated out in FIG. 6 differs from the conventional handover scenario shown in FIG. 4, in that a mechanism is provided, via the handover reject indication, for a communications device which has received a handover command to indicate that it is not going to comply with said handover command by exchanging upcoming signalling using the target radio resources indicated in the handover command. In other words, the handover reject indication provides a mechanism for the second communications device 612 to reject a handover request. Notably, this differs from a conventional handover failure indication which may be transmitted by a communications device which has attempted, but failed, to establish a new connection using indicated target resources, in that in accordance with embodiments of the present disclosure, no attempt is made to establish any connection using the indicated target resources.

It will be appreciated that the handover reject indication could be implemented in a variety of ways. For instance, in some embodiments, the handover reject indication comprises signalling transmitted to the first communications device 611 over the sidelink connection between the first and second communications devices 611, 612. In some embodiments, the handover reject indication comprises signalling transmitted to the first communications device 611 via one or more intervening entities, for instance, using communications resources associated with the cell controlled by the infrastructure equipment 602 and associated entities forming part of a RAN/ core network. In other words, if the first and second communications devices 611, 612 have respective connections to conventional (i.e. non peer-to-peer/D2D/V2V/V2X) network infrastructure, the handover reject indication may be routed between the first and second communications devices 611, 612 via said network infrastructure according to conventional communication protocols in the network (e.g. as user-plane data).

In other embodiments, the handover reject indication is indicated implicitly to the first communications device 611. For instance, when the first communications device 611 transmits the handover command to the second communications device 612, the first communications device 611 may initiate a timer. If the second communications device 612 fails to fulfil a certain condition before expiry of the timer, the first communications device 611 may interpret this as comprising an implicit handover reject indication by the second communications device 612.

The condition to be fulfilled may comprise transmitting signalling by the second communications device 612 to the first communications device 611 indicating that the second communications device 612 intends to exchange upcoming signalling on the target resources, or otherwise determining that the second communications device 612 is exchanging signalling on the target resources. The timer duration and condition(s) may be defined by a standard, established in accordance with the setup procedure initially used to establish the sidelink, or otherwise established via signalling between the first and second communications devices 611, 612. In some embodiments, the handover rejection indication comprises a rejection cause indication, indicating a reason why the handover command/target radio resources have been rejected by the second communications device 612. Based on the rejection cause indication the first communications device 611 may determine alternative target radio resources, and may transmit a subsequent handover command indicating the alternative target radio resources to the second communications device 612.

In some embodiments, in association with providing the first communications device 611 with the handover reject indication, the second communications device 612 may transmit or otherwise indicate to the first communications device 611 the preferred target set of radio resources determined by the second communications device 612 as part of step T6 as described above. This may be included in the handover reject indication. In some embodiments, the handover reject indication comprises an RRC Reconfiguration message transmitted to the first communications device 611 over a suitable communication link, the RRC Reconfiguration message including the indication of the preferred target set of radio resources. The indication of the preferred target set of radio resources may be transmitted to the first communications device 611 at a different time to the handover reject indication.

Thus, embodiments of the present technique provide, in addition to a mechanism enabling the second communications device 612 to indicate to the first communications device 611 it will not modify its current configuration used for wireless communication in the manner indicated by the handover command, for the second communications device 612 to inform the first communications device 611 of a preferred modification to its current configuration. As set out further herein in relation to FIG. 5, this can be useful since the first communications device 511 may not be aware of local radio conditions in the vicinity of second communications device 512 (such as the local interference scenario or loading of radio resources) and as such first communications device 511 may not have sufficient knowledge of the context of the second communications device 512 to be able to select the most suitable radio resources for the second communications device 512 to use for exchanging upcoming signalling.

In step T9, the first communications device 611 determines, in response to receiving the handover reject indication from the second communications device 612, that it should not initiate a procedure to modify its current configuration in accordance with the handover command. This is in contrast to a handover procedure according to conventional principles, whereby, having transmitted a handover command, an infrastructure equipment can assume that the communications device will at least attempt to implement the change in configuration indicated by the handover command.

Thus, having sent to the second communications device 612 the handover command indicating the target set of radio resources to be used by the second communications device 612 for exchanging upcoming signalling with at least one other communications device, the first communications device 611 may determine in response to receiving the handover reject indication that it will not itself transmit signalling to the second communications device 612 on the target radio resources, or indicate to a further communications device/cell that it may exchange signalling with the second communications device 612 on the target radio resources.

In some embodiments, in optional step T10, the first communications device 611 indicates to the infrastructure equipment 602 which has reserved radio resources as part of optional step T5 that the reserved resources can be released. For example, as part of step T5, the infrastructure equipment 602 may have reserved certain frequency/time resources on a radio subframe structure associated with a radio access interface provided by the infrastructure equipment 602 forming the cell, so as not to cause interference to upcoming signalling to be exchanged between the second communications device 612 and the other entity on the target radio resources indicated by the handover command. However, once the first communications device 611 receives the handover reject indication from the second communications device 612, the first communications device 611 may transmit a release indication to the infrastructure equipment 602 indicating that the target radio resources are no longer required.

The release indication may comprise explicit signalling transmitted by the first communications device 611 to the infrastructure equipment 602, or may be indicated implicitly to the infrastructure equipment 602 by the expiry of a timer associated with the resource reserve received in step T5.

In response to receiving the release indication, the infrastructure equipment 602 may release resources reserved in step T5, and allocate them for subsequent data transmissions within the cell.

In some embodiments, following optional step T10, the process continues with step T2, whereby the first communications device 611 determines an aspect of a current configuration used by the second communications device 612 for wireless communication should be modified. The first communications device 611 may thus determine not to seek to modify the current configuration, and thus the first and second communications devices 611, 612 may continue to exchange signalling according to a current configuration used by the second communications device 612 for wireless communication on the sidelink between the first and second communications devices 611, 612.

In some embodiments, alternatively, the first communications device 611 may progress to step T3 and determine a target set of radio resources to be used by the first communications device 611 for exchanging upcoming signalling with at least one other communications device. This determination may be largely as previously described, however if the handover reject indication transmitted by the second communications device 612 comprises an indication of why the handover command/target radio resources have been rejected by the second communications device 612, the first communications device 611 may take this information into account in step T3. In one instance, the second communications device 612 may have indicated that the handover command was rejected because the target resources were within a frequency band to which the second communications device 612 does not have access. Thus during step T3 the first communications device 611 may ensure a new set of target radio resources does not comprise resources within said frequency band.

However, in other instances, in accordance with step T11, the first communications device 611 indicates to the second communications device 612 that the second communications device 612 may exchange signalling with at least one other communications device using the preferred target set of radio resources optionally transmitted to the first communications device 611 in association with the handover reject indication in step T7. This indication may comprise explicit signalling, for example, transmitted over the sidelink between the first and second communications devices 611, 622, or routed via network infrastructure of a conventional network. In some embodiments, the signalling comprises RRC configuration signalling as set out elsewhere herein. In other embodiments, the first communications device 611 may indicate implicitly to the second communications device 612 that the second communications device 612 may exchange signalling with at least one other communications device using the preferred target set of radio resources, for instance, by not transmitting a further handover command message (or other signalling) to the second communications device 612. It will be appreciated there are many ways in which the first communications device 611 may indicate to the second communications device 612 that it may exchange signalling with at least one other communications device using the preferred target set of radio resources. In some instances, the preferred target set of radio resources transmitted from the second communications device 612 to the first communications device 611 comprises a list of preferred sets of target radio resources, and the first communications device 611 may determine a preferred set of target radio resources from said list. To support this determination, the first communications device 611 may make measurements of radio conditions on a plurality of sets of radio resources included in said list, and thereby determine that a given set is a preferred candidate. This may be because the first communications device 611 intends to exchange signalling with the second communications device 612 using one of the sets of radio resources included in said list, and thus determines that a preferred candidate set of radio resources as being most suitable for supporting said signalling, given, for instance, prevailing radio conditions in the vicinity of the first communications device 611. Having made this determination, the first communications device 611 may then indicate to the second communications device 612 which of the sets of radio resources on the list of preferred target radio resources the second communications device 612 may use to exchange signalling with the at least one other communications device.

As part of stage T11, the first communications device 611 may, in accordance with the approach of step T5, transmit signalling to cell 602 and/or other entities to reserve resources corresponding to the preferred set of target radio resources.

In optional step T12, either of the first and second communications devices 611, 612 may indicate to a cell whose coverage area they are within (e.g. cell 602) aspects of a configuration to be used for an exchange of signalling between the second communications device 612 and the target wireless communications device. This signalling may be implemented in broadly the same manner as the resource reserve request of step T5, in that it indicates to the cell 602 a set of resources to be used to establish the connection between the second communications device 612 and the target wireless communications device, enabling the cell 602 to avoid causing interference with the exchange of signalling between the second communications device 612 and the target wireless communications device. This step may furthermore comprise informing cell 602 of the handover so that cell 602 and/or a core network entity connected to cell 602 can use this information in its own tracking, mobility, scheduling and measurement procedures.

In step T13, the second communications device 612 exchanges data with the at least one other wireless communications device using the preferred target set of radio resources. In some example embodiments, the at least one other wireless communications device is the first communications device 611, and thus the procedure outlined with respect to steps T1 to T12 may be considered to comprise a means of transferring sidelink communications between the first and second communications devices 611, 612 from one set of radio resources to another. In some such embodiments, this may comprise an inter-frequency handover to reconfigure the sidelink such that it can continue to be used to support signalling exchange between the first and second communications devices 611, 612, albeit on a different frequency. Thus as described further herein, this handover procedure may in some instances be used by the first communications device 611 to establish the sidelink connection on resources within an unlicensed band, for instance, to respond to overloading of current resources being used to support the sidelink within a frequency band associated with a cell within whose coverage area one or both of the first and second communications devices 611, 612 are situated.

In the example of FIG. 6, the other communications device with which the second communications device 612 communicates directly via the sidelink connection after the handover procedure is the first communications device 611.

Figure 7:
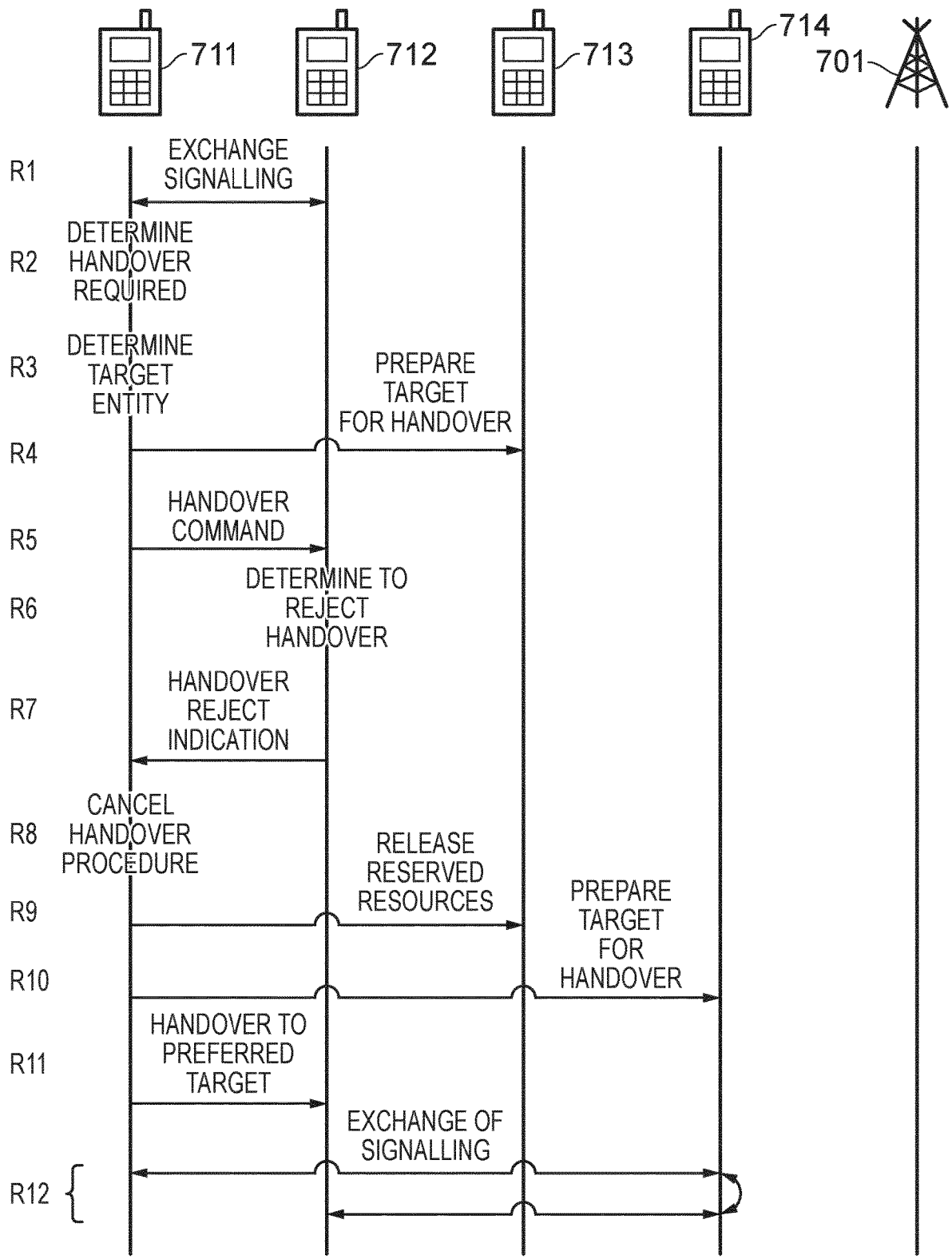
FIG. 7 is a ladder diagram representing some aspects of a wireless communications device handover scenario which may be used in accordance with embodiments of the present disclosure.

In some embodiments, as is illustrated in FIG. 7 and described below, the sidelink connection comprises a relay communications device, such that the other communications device with which the second communications device 612 communicates directly after the handover procedure is the relay communications device. Accordingly, the target radio resources indicated in the handover command may be for the transmission of signalling between the second communications device 612 and the relay communications device.

FIG. 7 is a ladder diagram schematically representing aspects of an approach in accordance with embodiments of the present disclosure. In particular, the diagram represents processes and signalling exchange associated with first to fourth wireless communications devices 711, 712, 713, 714 (which can be considered to correspond to first to fourth wireless communications devices 511, 512, 513, 514 shown schematically in FIG. 5; the first and second communications devices 711, 712 may corresponding substantially to the first and second communications devices 611, 612 illustrated in FIG. 6). Also shown is an infrastructure equipment 701 providing a cell, which may be established in accordance with the LTE/NR technologies described further herein, and which in accordance with some embodiments of the disclosure may be configured to exchange signalling with one or more of the first to fourth communications devices 711, 712, 713, 714.

The processing represented in FIG. 7 starts in step R1 in which the first communications device 711 has established a configuration for exchanging signalling with the second communications device 712 over a wireless interface. The first and second communications devices 711, 712 are therefore configured to exchange data directly with one another over a sidelink connection, as described above in respect of step T1 of FIG. 6.

In step R2, the first communications device 711 determines that an aspect of a current configuration used by the second communications device 712 for wireless communication should be modified. Step R2 may accordingly correspond substantially to step T2 described above in respect of the processes of FIG. 6.

In step R3, the first communications device 711 identifies a target entity with which the second communications device 712 is to exchange upcoming signalling, the target entity to act as a relay communications device. A suitable target entity may be determined by any suitable approach for device discovery in peer-to-peer communication contexts, and may be for example another communications device such as one of the third and fourth communications device 713, 714, or the infrastructure equipment 701. For instance, the first communications device 711 may detect beacon signalling or reference signalling transmitting by one or more of the third and fourth communications devices 713, 714 and/or by the infrastructure equipment 702.

Prior to, or as part of step R3, the first communications device 711 may communicate with one or more of the third and fourth communications devices 713, 714 and the infrastructure equipment 701 to determine aspects of their capabilities and/or location in accordance with conventional techniques. The first communications device 711 may also receive from the infrastructure equipment 702 candidate target entity information which can be used by the first communications device 711 to identify a target entity.

The selection of the target entity may comprise similar processing to that described above in respect of step T3 of the process of FIG. 6. In some embodiments, the first communications device 711 polls one or more nearby communications device to find a suitable target entity.

In the example of FIG. 7, the first communications device 711 determines in step R3 that the third communications device 713 is the target entity with which the second wireless communications device 712 is to exchange upcoming signalling.

In step R4, the first communications device 711 may configure the third communications device 713 to be prepared to exchange signalling with the second communications device 712. This may comprise transmitting configuration information to the third communications device 713 to support establishment of a sidelink connection between the third communications device 713 and the first communications device 711.

As part of this process, the first communications device 711 may transmit a resource reservation request indication to the third communications device 713 to request the third communications device 713 to reserve radio and other resources to be used for establishing a connection between the first communications device 711 and the third communications device 713. The resource reservation request may further comprise a request for the establishment of a sidelink between the third communications device 713 and the second communications device 712, so that the third communications device 713 is able to act as a relay between the first communications device 711 and the second communications device 712.

In response, the third communications device 713 may reserve communications resources for each new sidelink and may transmit handover information (not shown in FIG. 7) to the first communications device 711. This handover information may comprise an identifier to be used by the second communications device 712 for communicating with the third communications device 713 (for example a radio network temporary identifier, RNTI) and/or a preamble to be used by the second communications device 712 as part of a random access procedure to establish a sidelink connection with the third communications device 713. The handover information additionally include an indication of communications resources to be used for the sidelink between the first communications device 711 and the third communications device 713, and of communications resources to be used for the sidelink between the second communications device 712 and the third communications device 713.

The third communications device 713 may initiate a timer to control when the reserved resources can be released. If the reserved resources are not used for the respective sidelinks before the elapse of the timer, the third communications device 713 will un-reserve the resources, which may comprise enabling the resources to be used by other devices.

In step R5, the first communications device 711 transmits a handover command to the second communications device 712. The handover command may comprise an RRC Reconfiguration message. The handover command may comprise an indication of the identity of the third communications device 713 to act as the target relay communications device and may be transmitted over the sidelink between first and second communications devices 711 and 712, or may be routed through other network entities, for example, via exchange of signalling between each of first and second communications devices 711 and 712 and the infrastructure equipment 701.

In step R6, the second communications device 712, in response to receiving the handover command, determines that it will continue to operate using the current configuration, and/or that it will not modify its current configuration used for wireless communication in accordance with the handover command.

Determining that it will continue to operate using the current configuration may comprise determining that the proposed sidelink connection with the third communications device 713 is unsuitable, or less preferred. The determination in respect of the proposed sidelink connection with the third communications device 713 may be substantially using the same criteria as described in respect of step T7 of the process of FIG. 6.

In addition or alternatively, the determination may comprise deterring that the target third communications device 713 may be unsuitable because it is out of range of the second communications device 712, or is not configured with a compatible wireless access technology to those usable by the second communications device 712.

As in step T7 of the process of FIG. 6, the second communications device 712 may determine a suitable and/or preferred target device to act as a relay, such as the fourth communications device 714. The determination that the fourth communications device 714 is a more preferred or suitable target device may be based on, for example, pre-configured preferences, radio measurements of transmissions by the fourth communications device 714, capabilities of the fourth communications device 714, and such like.

In addition, in a similar manner to that described in step T7, the second communications device 712 may additionally or alternatively identify more preferred or suitable radio resources for use for a sidelink connection between the second communications device 712 and the target communications device (either the target device identified in the handover command, or the target device identified by the second communications device 712).

Accordingly, in some embodiments, the determination not to change to the new configuration is in response to one or more of:
 determination that communications using the proposed sidelink with the third communications device 713 is not suitable (for example, due to interference, listen-before-talk requirements, application level preferences, pre-configured preferences, and/or respective device capabilities),
 identification of alternative, preferred radio resources for communication with the third communications device 713, and
 identification of an alternative communications device for establishing a sidelink connection.

In step R7, the second communications device 712 transmits to the first communications device 711 a handover reject indication which indicates to the first communications device 711 that the second communications device 712 will not modify its current configuration used for wireless communication in the manner indicated by the handover command.

Accordingly, embodiments of the present technique provide a method of receiving a handover command relating to a sidelink connection, determining that the proposed communications resources and/or target relay device are unsuitable or less preferable, transmitting in response to the handover command a handover reject indication, and refraining from implementing the configuration indicated by the handover command.

The handover rejection indication may comprise a reject cause indication, indicating why the handover command/target radio resources have been rejected by the second communications device 712.

The first communications device 711 in determining an alternative target wireless communications device to indicate in association with a subsequent handover command to be transmitted to the second communications device 712.

The second communications device 712 may transmit a preferred target indication to the first communications device 711 of the preferred target wireless communication device (the fourth communications device 714) determined by the second communications device 712 as described above. The preferred target indication may form a part of the handover reject indication, or may be transmitted separately. In some embodiments, the handover reject indication comprises an RRC Reconfiguration message transmitted to the first communications device 711 via a suitable communication link, the RRC Reconfiguration message including the preferred target indication.

As described above in respect of step T8 of the process of FIG. 6, the second communications device 712 may transmit an indication of the preferred target set of radio resources. The preferred target set of radio resources may be indicated as preferred in respect of future communications via a sidelink connection with the preferred target communications device.

Accordingly, embodiments of the present technique provide a method for transmitting, in association with a handover reject indication, a preferred target indication and/or an indication of preferred target set of radio resources.

The first communications device 711 may thus be made aware of a target device and/or radio resources considered suitable (i.e. meeting certain predetermined criteria) by the second communications device 712.

In step R8, in response to receiving the handover reject indication from the second communications device 712, the first communications device 711 cancels the proposed handover procedure.

In step R9, the first communications device 711 may indicate implicitly or explicitly to the third communications device 713 that the handover procedure will not proceed. In the example of FIG. 7, the cancellation indication is explicit. In some embodiments, the first communications device 711 may additionally indicate implicitly or explicitly to the second communications device 712 that the handover procedure will not proceed.

In response to the indication at step R9, the third communications device 713 may release any resources reserved in response to the indication received at step R4.

In some embodiments, the procedure may continue with step R2. In this subsequent iteration of the step, the first communications device 711 may either determine that no handover is to take place, or that the handover is still required. In the latter case, the process continues with step R3, and so on, as described above. This determination may be based on one or more of the reject cause indication, the preferred target indication, and the indication of preferred target set of radio resources and/or the presence or absence thereof.

For example, if the reject cause indicates that the proposed frequency band is not supported by the second communications device 712, and no preferred target indication is received, and no preferred target set of radio resources is indicated, the first communications device 711 may determine that there is no suitable handover candidate, and may determine that no handover is to take place.

In another example, if the handover reject indication transmitted by the second communications device 712 comprises an indication of why the handover command/target radio resources have been rejected by the second communications device 712, the first communications device 711 may take this information into account in the subsequent iteration of step R3. For example, the second communications device 712 may have indicated that the handover command was rejected because the proposed target device (the third communications device 713) was out of communications range of the second communications device 712. Thus during the subsequent iteration of step R3 the first communications device 711 may ensure that the new target wireless communication device is not the third communications device 713.

Thus in some embodiments, the first communications device 711 may determine alternative communications resources and/or an alternative target device to act as a relay. In the example of FIG. 7, based on the indication of the fourth communications device 714 as preferred target device, the first communications device 711 select this as the new target device. Accordingly, in step R10 the first communications device 711 transmits signalling to the preferred target wireless communication device (the fourth communications device 714), in a similar manner to that in step R4 as described above.

Subsequently, in step R11, the first communications device 711 transmits a (revised) handover command to the second communications device 712, in a similar manner as described in respect of step R5 above.

Based on the revised handover command indicating that the target device is the fourth communications device 714 and determining that the indicated communications resources are suitable and/or preferred (i.e. in general, meet pre-determined criteria), the second communications device 712 implements the handover in accordance with the revised handover command.

Accordingly, at step R12, the communications between the first communications device 711 and the second communications device 712 continue, by means of sidelink connections between the first communications device 711 and the fourth communications device 714 and between the second communications device 712 and the fourth communications device 714.

In some embodiments of the present technique, the handover results in the second communications device 612, 712 obtaining service from a target communications device. In accordance with some embodiments, the target communications device is proposed by the second communications device but cannot communicate directly with the first communications device. In order to request the handover (e.g. to request the reservation of resources), the first communications device transmits a request to an infrastructure equipment, the infrastructure equipment being capable of communicating directly with the target communications device.

Figure 8:
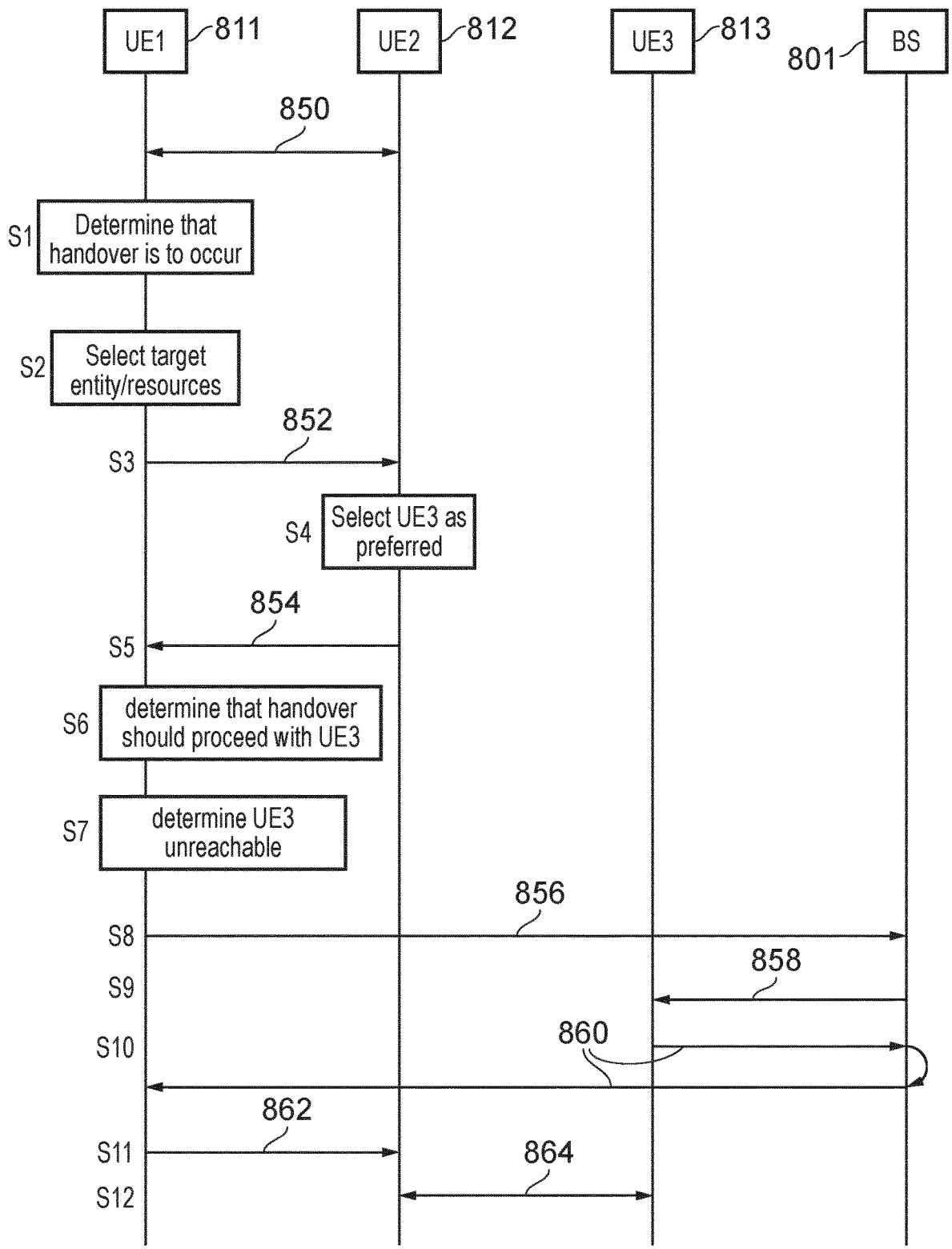
FIG. 8 illustrates a message sequence chart showing a handover in accordance with embodiments of the present technique.

FIG. 8 illustrates a message sequence chart showing a handover in accordance with embodiments of the present technique. In particular, the diagram represents processes and signalling exchange associated with first, second and third communications devices 811, 812, 813 (which can be considered to correspond to first, second and fourth communications devices 511, 512, 514 respectively shown schematically in FIG. 5). Also shown is an infrastructure equipment 801 providing a cell, which may be established in accordance with the LTE/NR technologies described further herein, and which in accordance with some embodiments of the disclosure may be configured to exchange signalling with one or more of the first to third communications devices 811, 812, 813.

In the example of FIG. 8, the first communications device 811 determines at step S1 that a handover for an existing connection 850 between the first communications device 811 and the second communications device 812 should occur.

At step S2, the first communications device 811 determines a target entity and/or target communications resources to be used for a new connection with the second communications device 812.

Following steps S1 and S2, at step S3, the first communications device 811 transmits a handover command 852 to the second communications device 812.

Steps S1-S3 may be substantially in accordance with the corresponding steps of the processes illustrated in FIG. 6 and/or FIG. 7 and described above.

In response to receiving the handover command 852, at step S4, the second communications device 812 determines that the third communications device 813 is a preferred or alternate target device for a handover. For example, the second communications device 812 determines that services and/or information which it currently obtains from, or via, the first communications device 811 may be obtained from, or via the third communications device 813. The second communications device 812 may determine that obtaining services and/or information via a connection to the third communications device 813 is preferable to using a connection in accordance with the handover command 852.

In response to the determination at step S4, the second communications device 812 transmits a handover reject indication 854 to the first communications device in step S5. The handover reject indication 854 comprises an indication of an identity of the third communications device 813.

In response to receiving the handover reject indication 854, at step S7 the first communications device 811 determines that the handover should proceed in order to establish a connection between the second communications device 812 and the third communications device 813, i.e. in accordance with the indication within the handover reject message 854.

In some examples in accordance with some embodiments, as described above, the first communications device 811 would transmit an indication to the third communications device 813 in order to request the reservation of resources in preparation for the handover.

However, in the example of FIG. 8, the first communications device 811 determines at step S7 that it is unable to directly communicate with the third communications device 813. This may be because it is out of wireless communications range of the third communications device 813 and/or because it does not support any common communications technique (or parameters thereof) in common with the third communications device 813, or for any other reason.

In response to this determination, at step S8 the first communications device 811 transmits a handover support request 856 to the infrastructure equipment 801, the handover support request 856 comprising an indication of an identity of the third communications device 813. The handover support request 856 may further comprise an indication of an identity of the first communications device 811 and/or parameters for enabling the third communications device 813 to prepare for the handover. For example, the handover support request 856 may comprise parameters contained in the resource reservation request described above in respect of step R4 of the process illustrated in FIG. 7.

In response to the handover support request 856, the infrastructure equipment 801 transmits at step S9 a resource reservation request 858 to the third communications device 813, requesting the third communications device 813 to reserve communications resources for a direct connection between the second communications device 811 and the third communications device 813. If the third communications device 813 is able to support the requested handover, it reserves resources and at step S10 transmits a handover configuration message 860 to the infrastructure equipment 801. The handover configuration message 860 is forwarded by the infrastructure equipment 801 to the first communications device 811.

At step S11, in response to receiving the handover configuration message 860, the first communications device 811 transmits a handover command 862 to the second communications device 812, the handover command 862 comprising parameters included in the handover configuration message 860, such as reserved resources, communications parameters, and the like.

In response to receiving the handover command 862, the second communications device 812 performs at step S12 the handover and establishes a direct connection 864 with the third communications device 813.

Accordingly, according to embodiments of the present technique, a handover of a sidelink connection may be carried out even where the first communications device and third communications device (who are the respective endpoints of the sidelink connection with the second communications device before and after the handover) cannot communicate directly with each other.

In accordance with examples described above, the first communications device (such as the first communications device 711) selects a single set of radio resources and (if applicable) a single target device to act as a relay. In some embodiments of the present disclosure, the first communications device 711 selects a plurality of sets of radio resources and (if applicable) one or more target devices to act as a relay, all of which are indicated in the handover command. In some such embodiments, there may be no preparation phase (i.e. there may be no advance communications from the first communications device 711 to other infrastructure equipment and/or target devices) prior to the transmission of the handover command to the second communications device 712.

In such embodiments, in response to receiving a handover command comprising an indication of a plurality of sets of radio resources and/or two or more target devices, the second communications device (such as the second communications device 712) may select a preferred target device and/or preferred set of radio resources in accordance with measurements, preferences, capability and the like, and transmit an indication of the selected resources and/or devices to the first communications device 711. The first communications device 711 may then proceed with the handover process (such as that illustrated in FIG. 6 or FIG. 7, starting at step T3 or R3 respectively).

In accordance with some embodiments, the first communications device 711 may transmit a sidelink initiation request to the target device selected to act as the relay (e.g. in step R10, the fourth communications device 714), requesting the fourth communications device 714 to initiate the establishment of a sidelink connection between the fourth communications device 714 and the second communications device 712.

In some embodiments, prior to sending the preferred target indication in step R7, the second communications device 712 may transmit a resource reservation request indication to the fourth communications device 714, to request that the fourth communications device 714 reserves suitable resources for sidelink connections between the first communications device 711 and the fourth communications device 714 and between the second communications device 712 and the fourth communications device 714. In other words, prior to step R7, the second communications device 712 may carry out steps corresponding substantially to steps R3 and R4 as described above, in respect of the fourth communications device 714.

In such embodiments, the handover rejection indication and/or the preferred target indication may comprise an indication that the resource reservation request indication has been transmitted to the fourth communications device 714.

Similarly, in response to receiving the resource reservation request indication, the fourth communications device 714 may transmit an indication of radio resources to the second communications device 712, corresponding to reserved radio resources. Some or all of these may be indicated to the first communications device 711 as the preferred target set of radio resources.

In some embodiments, therefore, the handover reject indication may itself comprise, substantially, a handover command indication. In response to receiving the handover reject indication providing radio resources and target device, the first communications device 711 may implement the corresponding change in configuration so as to establish sidelink communications between the first communications device 711 and the fourth communications device 714. The first communications device 711 may indicate that it is to implement (or has implemented) the corresponding change in configuration to the second communications device 712 explicitly or implicitly (e.g. by transmitting no further handover-related signalling via the existing sidelink connection for a predetermined duration).

In some embodiments, in response to such an indication, the second communications device 712 determines that the first communications device 711 is to implement, or has implemented, the corresponding change in configuration so as to establish sidelink communications between the first communications device 711 and the fourth communications device 714. In response to this determination, the second communications device 712 may establish a sidelink connection with the fourth communications device 714, and hence end-to-end connectivity with the first communications device 711 via the fourth communications device 714 acting as a relay.

In some embodiments, the preferred target device indication indicates a plurality of wireless communication devices. In some such embodiments, the target device indication comprises an indication of a relative preference for each indicated wireless communications devices. The first communications device 711 may select a new target wireless communication device from the plurality.

To support this determination, the first communications device 711 may make measurements of signalling (e.g. beacon or reference signals) between itself and one or more of the wireless communication devices indicated in the preferred target device indication, and thereby determine that a given wireless communication device is the new target wireless communications device.

It will be appreciated that though the target wireless communication device will often be a terminal device, such as a terminal device implemented within a vehicle in a V2V or V2X scenario, in other embodiments, the target wireless communication device may comprise infrastructure equipment generating a cell which forms part of a RAN of a wireless communications network such as those shown schematically in FIGS. 1 and 2 (for instance, a base station, a TRP, or a controlling node). In such scenarios, the first communications device 711 may be considered to hand over a the second communications device 712 from communicating with the first communications device 711 over a sidelink, to communicating with a conventional network entity in the manner known for communications between wireless communication devices and base stations/TRPs/controlling nodes in LTE and NR contexts.

In some such embodiments, the end-to-end connectivity between the first and second communications devices 711, 712 may be via one or more infrastructure equipment, and not in a device-to-device/peer-to-peer manner.

It will also be appreciated that the term 'handover' as used herein may in some instances imply that the first communications device 711 which has a sidelink with the second communications device 712 may cease to communicate with the second communications device 712 as part of the process of assisting the second communications device 712 to communicate with a target wireless communication device. However in other instances, the first communications device 711 and the second communications device 712 may maintain their sidelink communications, and the handover in this instance comprises establishing a further connection between the second communications device 712 and another entity. In these instances, the first communications device 711 can be considered to assist the second communications device 712 in a procedure to establish a connection to a further wireless communication device.

At step R3 and/or step R4, in order to facilitate an establishment of a connection between the second communications device 712 and a target communications device (such as the third or fourth communications device 713, 714) the first communications device 711 may request configuration information from one or more of the second, third or fourth communications devices 712, 713, 714 which can be conveyed to a one of the other communications devices to assist the second communications device 712 in establishing a sidelink connection with the target determined by the first communications device 711. This may broadly follow the approaches set out in respect of the conventional handover scenario set out in relation to FIG. 4, whereby a first and second infrastructure equipment exchange configuration information which can be used to support a handover of a communications device from a first cell to a second cell, and wherein the first infrastructure equipment may transmit to the communications device information to be used when connecting to the second cell.

In the example illustrated in FIG. 7, at step R4 only a single other communications device (the third communications device 713) is contacted in response to determining the target entity at step R3. However, in some embodiments, the first communications device 711 may transmit an indication to one or more additional entities, such as the infrastructure equipment 701, to indicate the potential handover procedure. In response, the infrastructure equipment 701 may reserve resources (i.e. refrain from selecting them for the transmission of data to or by a communications device in a cell controlled by the infrastructure equipment 701) to reduce subsequent interference to either the sidelink connections (after the handover) or to connections between the infrastructure equipment 701 and a communications device served in a corresponding cell.

Thus there has been disclosed a method of operating a first wireless communications device to communicate with a second wireless communications device, the method comprising transmitting or receiving signals representing data to or from the second wireless communications device over a wireless interface, the signals being transmitted or received by the second wireless communications device in accordance with a current configuration, determining that the current configuration is to be changed to a first new configuration, transmitting a first handover command to the second wireless communications device over the wireless interface, the first handover command comprising an indication of the first new configuration to replace the current configuration, and receiving via the wireless interface a handover reject indication from the second wireless communications device, the handover reject indication transmitted in response to the first handover command and indicating that the second wireless communications device is to continue to operate in accordance with the current configuration.

There has also been disclosed a method of operating a second wireless communications device to communicate with a first wireless communications device, the method comprising transmitting or receiving signals representing data to or from the first wireless communications device over a wireless interface in accordance with a current configuration, receiving a first handover command from the first wireless communications device over the wireless interface, the first handover command comprising an indication of a first new configuration to replace the current configuration, transmitting via the wireless interface a handover reject indication, the handover reject indication indicating to the first wireless communications device that the second wireless communications device is to continue to operate in accordance with the current configuration, and refraining from replacing the current configuration with the first new configuration.

Corresponding communications devices, infrastructure equipment and methods therefore, and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type of communications device operating with a wireless link to the communication network.

It will further be appreciated that the principles described herein are not applicable only to LTE-based wireless telecommunications systems, but are applicable for any type of wireless telecommunications system that supports peer-to-peer data transmission.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a first communications device to communicate with a second communications device, the method comprising transmitting or receiving signals representing data to or from the second communications device over a wireless interface, the signals being transmitted or received by the second communications device in accordance with a current configuration, determining that the current configuration is to be changed to a first new configuration, transmitting a first handover command to the second communications device over the wireless interface, the first handover command comprising an indication of the first new configuration to replace the current configuration, and receiving via the wireless interface a handover reject indication from the second communications device, the handover reject indication transmitted in response to the first handover command and indicating that the second communications device is to continue to operate in accordance with the current configuration.

Paragraph 2. A method according to paragraph 1 wherein the first handover command comprises an indication of a target set of communications resources to be used in accordance with the first new configuration.

Paragraph 3. A method according to paragraph 1 or paragraph 2, wherein in accordance with the new configuration the signals representing the data are to be transmitted to or received from a first target communications device different from the first communications device.

Paragraph 4. A method according to any of paragraphs 1 to 3, the method comprising in response to receiving the handover reject indication, transmitting a second handover command, the second handover command comprising an indication of a second new configuration.

Paragraph 5. A method according to paragraph 4, wherein the handover reject indication comprises an indication of a preferred target set of communications resources.

Paragraph 6. A method according to paragraph 5, wherein according to the second new configuration, signals representing the data are to be transmitted or received using the preferred target set of radio resources.

Paragraph 7. A method according to any of paragraphs 4 to 6, wherein the handover reject indication comprises an indication of a preferred target communications device.

Paragraph 8. A method according to paragraph 7, wherein according to the second new configuration, signals representing the data are to be transmitted or received to or from the preferred target communications device.

Paragraph 9. A method according to paragraph 7 or paragraph 8, the method comprising in response to receiving the handover reject indication, transmitting a request for an allocation of communications resources by the preferred target communications device.

Paragraph 10. A method according to paragraph 9, the method comprising determining that the preferred target communications device cannot receive signalling comprising the request for the allocation of communications resources transmitted from the first communications device directly to the preferred target communications device, and in response to determining that the preferred target communications device cannot receive signalling comprising the request for the allocation of communications resources transmitted from the first communications device directly to the preferred target communications device, transmitting the request for the allocation of communications resources to an infrastructure equipment, for forwarding to the preferred target communications device.

Paragraph 11. A method according to paragraph 10, the method comprising receiving signalling transmitted by the infrastructure equipment representing an indication of communication resources reserved by the preferred target communications device, wherein in accordance with the second new configuration signals representing the data are to be transmitted or received to or from the preferred target communications device using the communication resources reserved by the preferred target communications device.

Paragraph 12. A method according to any of paragraphs 1 to 11 wherein signalling comprising the first handover command is transmitted to a device other than the second communications device for forwarding to the second communications device.

Paragraph 13. A method according to paragraph 12, wherein the device other than the first communications device is one of a third communications device and an infrastructure equipment of a wireless communications network.

Paragraph 14. A method of operating a second communications device to communicate with a first communications device, the method comprising transmitting or receiving signals representing data to or from the first communications device over a wireless interface in accordance with a current configuration, receiving a first handover command from the first communications device over the wireless interface, the first handover command comprising an indication of a first new configuration to replace the current configuration, transmitting via the wireless interface a handover reject indication, the handover reject indication indicating to the first communications device that the second communications device is to continue to operate in accordance with the current configuration, and refraining from replacing the current configuration with the first new configuration.

Paragraph 15. A method according to paragraph 14 wherein the first handover command comprises an indication of a target set of communications resources to be used in accordance with the first new configuration.

Paragraph 16. A method according to paragraph 14 or paragraph 15, wherein in accordance with the new configuration the signals representing the data are to be transmitted to or received from a first target communications device different from the first communications device.

Paragraph 17. A method according to any of paragraphs 14 to 16, the method comprising after transmitting the handover reject indication, receiving a second handover command, the second handover command comprising an indication of a second new configuration.

Paragraph 18. A method according to paragraph 17, wherein the handover reject indication comprises an indication of a preferred target set of communications resources.

Paragraph 19. A method according to paragraph 18, wherein according to the second new configuration, signals representing the data are to be transmitted or received using the preferred target set of radio resources.

Paragraph 20. A method according to any of paragraphs 17 to 19, wherein the handover reject indication comprises an indication of a preferred target communications device.

Paragraph 21. A method according to paragraph 20, wherein according to the second new configuration, signals representing the data are to be transmitted or received to or from the preferred target communications device.

Paragraph 22. A method according to any of paragraphs 14 to 21 wherein signalling comprising the first handover command is received from a device other than the first communications device.

Paragraph 23. A method according to paragraph 22, wherein the device other than the first communications device is one of a third communications device and an infrastructure equipment of a wireless communications network.

Paragraph 24. A method of operating an infrastructure equipment in a wireless communications network, the method comprising receiving from a first communications device a handover support request, the handover support request comprising an indication of an identify of a third communications device, in response to receiving the handover support request, transmitting a resource reservation request to the third communications device, receiving a handover configuration message from the third communications device, the handover configuration message transmitted in response to the handover support request and comprising an indication that the third communications device has reserved communications resources for a direct connection between a second communications device and the third communications device, and in response to receiving the handover configuration message, transmitting the handover configuration message to the first communications device.

Paragraph 25. A method according to paragraph 24, wherein the handover support request comprises an indication of an identity of the second communications device.

Paragraph 26. A first communications device, the first communications device comprising a transmitter configured to transmit signals representing data to a second communications device over a wireless interface, the signals being received by the second communications device in accordance with a current configuration, a receiver configured to receive signals representing data transmitted by the second communications device over the wireless interface in accordance with the current configuration, and a controller configured to control the transmitter and the receiver so that the first communications device is operable: to determine that the current configuration is to be changed to a first new configuration, to transmit a first handover command to the second communications device over the wireless interface, the first handover command comprising an indication of the first new configuration to replace the current configuration, and to receive via the wireless interface a handover reject indication from the second communications device, the handover reject indication transmitted in response to the first handover command and indicating that the second communications device is to continue to operate in accordance with the current configuration.

Paragraph 27. Circuitry for a first communications device, the circuitry comprising transmitter circuitry configured to transmit signals representing data to a second communications device over a wireless interface, the signals being received by the second communications device in accordance with a current configuration, receiver circuitry configured to receive signals representing data transmitted by the second communications device over the wireless interface in accordance with the current configuration, and controller circuitry configured to control the transmitter circuitry and the receiver circuitry so that the first communications device is operable: to determine that the current configuration is to be changed to a first new configuration, to transmit a first handover command to the second communications device over the wireless interface, the first handover command comprising an indication of the first new configuration to replace the current configuration, and to receive via the wireless interface a handover reject indication from the second communications device, the handover reject indication transmitted in response to the first handover command and indicating that the second communications device is to continue to operate in accordance with the current configuration.

Paragraph 28. A second communications device, the second communications device comprising a transmitter configured to transmit signals representing data to a first communications device over a wireless interface, the signals being received by the first communications device in accordance with a current configuration, a receiver configured to receive signals representing data transmitted by the first communications device over the wireless interface in accordance with the current configuration, and a controller configured to control the transmitter and the receiver so that the second communications device is operable: to receive a first handover command from the first communications device over the wireless interface, the first handover command comprising an indication of a first new configuration to replace the current configuration, to transmit via the wireless interface a handover reject indication, the handover reject indication indicating to the first communications device that the second communications device is to continue to operate in accordance with the current configuration, and to refrain from replacing the current configuration with the first new configuration.

Paragraph 29. Circuitry for a second communications device, the circuitry comprising transmitter circuitry configured to transmit signals representing data to a first communications device over a wireless interface, the signals being received by the first communications device in accordance with a current configuration, receiver circuitry configured to receive signals representing data transmitted by the first communications device over the wireless interface in accordance with the current configuration, and controller circuitry configured to control the transmitter circuitry and the receiver circuitry so that the second communications device is operable: to receive a first handover command from the first communications device over the wireless interface, the first handover command comprising an indication of a first new configuration to replace the current configuration, to transmit via the wireless interface a handover reject indication, the handover reject indication indicating to the first communications device that the second communications device is to continue to operate in accordance with the current configuration, and to refrain from replacing the current configuration with the first new configuration.

Paragraph 30. Infrastructure equipment for use in a wireless communications network, the infrastructure equipment providing a wireless access interface, wherein the wireless access interface is for the transmission of data to and the reception of data from a communications device, the infrastructure equipment comprising a transmitter configured to transmit signals to a communications device via the wireless access interface in a cell, a receiver configured to receive data from the communications device, and a controller configured to control the transmitter and the receiver so that the infrastructure equipment is operable: to receive from a first communications device a handover support request, the handover support request comprising an indication of an identify of a third communications device, in response to receiving the handover support request, to transmit a resource reservation request to the third communications device, to receive a handover configuration message from the third communications device, the handover configuration message transmitted in response to the handover support request and comprising an indication that the third communications device has reserved communications resources for a direct connection between a second communications device and the third communications device, and in response to receiving the handover configuration message, to transmit the handover configuration message to the first communications device.

Paragraph 31. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry configured to control the transmitter circuitry and the receiver circuitry so that the infrastructure equipment is operable: to receive from a first communications device a handover support request, the handover support request comprising an indication of an identify of a third communications device, in response to receiving the handover support request, to transmit a resource reservation request to the third communications device, to receive a handover configuration message from the third communications device, the handover configuration message transmitted in response to the handover support request and comprising an indication that the third communications device has reserved communications resources for a direct connection between a second communications device and the third communications device, and in response to receiving the handover configuration message, to transmit the handover configuration message to the first communications device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "LTE for UMTS OFDMA and SC-FDMA based radio access", John Wiley and Sons, 2009.

[2] R2-133840, "CSMA/CA based resource selection", San Francisco, USA, November 2013

[3] 3GPP TR 38.885 "Study on NR Vehicle-to-Everything (V2X)"

What is claimed is:

1. A method of operating a first communications device to communicate with a second communications device, the method comprising:
    transmitting or receiving signals representing data to or from the second communications device over a wireless interface, the signals being transmitted or received by the second communications device in accordance with a current configuration,
    determining that the current configuration is to be changed to a first new configuration,
    transmitting a first handover command to the second communications device over the wireless interface, the first handover command comprising an indication of the first new configuration to replace the current configuration, and
    receiving via the wireless interface a handover reject indication from the second communications device, the handover reject indication transmitted in response to the first handover command and indicating that the second communications device is to continue to operate in accordance with the current configuration.

2. The method according to claim 1 wherein the first handover command comprises an indication of a target set of communications resources to be used in accordance with the first new configuration.

3. The method according to claim 1, wherein in accordance with the new configuration the signals representing the data are to be transmitted to or received from a first target communications device different from the first communications device.

4. The method according to claim 1, the method comprising:
    in response to receiving the handover reject indication, transmitting a second handover command, the second handover command comprising an indication of a second new configuration.

5. The method according to claim 4, wherein the handover reject indication comprises an indication of a preferred target set of communications resources.

6. The method according to claim 5, wherein according to the second new configuration, signals representing the data are to be transmitted or received using the preferred target set of radio resources.

7. The method according to claim 4, wherein the handover reject indication comprises an indication of a preferred target communications device.

8. The method according to claim 7, wherein according to the second new configuration, signals representing the data are to be transmitted or received to or from the preferred target communications device.

9. The method according to claim 7, the method comprising:
    in response to receiving the handover reject indication, transmitting a request for an allocation of communications resources by the preferred target communications device.

10. The method according to claim 9, the method comprising:
    determining that the preferred target communications device cannot receive signalling comprising the request for the allocation of communications resources transmitted from the first communications device directly to the preferred target communications device, and in response to determining that the preferred target communications device cannot receive signalling comprising the request for the allocation of communications resources transmitted from the first communications device directly to the preferred target communications device, transmitting the request for the allocation of communications resources to an infrastructure equipment, for forwarding to the preferred target communications device.

11. The method according to claim 10, the method comprising:
receiving signalling transmitted by the infrastructure equipment representing an indication of communication resources reserved by the preferred target communications device, wherein
in accordance with the second new configuration signals representing the data are to be transmitted or received to or from the preferred target communications device using the communication resources reserved by the preferred target communications device.

12. The method according to claim 1 wherein signalling comprising the first handover command is transmitted to a device other than the second communications device for forwarding to the second communications device.

13. The method according to claim 12, wherein the device other than the first communications device is one of a third communications device and an infrastructure equipment of a wireless communications network.

14. The method according to claim 1, wherein current configuration is a peer-to-peer communication configuration.

15. The method according to claim 14, wherein the peer-to-peer communication configuration is one of a D2D, V2V, and V2X configuration.

16. A method of operating an infrastructure equipment in a wireless communications network, the method comprising:
receiving from a first communications device a handover support request, the handover support request comprising an indication of an identify of a third communications device,
in response to receiving the handover support request, transmitting a resource reservation request to the third communications device,
receiving a handover configuration message from the third communications device, the handover configuration message transmitted in response to the handover support request and comprising an indication that the third communications device has reserved communications resources for a direct connection between a second communications device and the third communications device, and
in response to receiving the handover configuration message, transmitting the handover configuration message to the first communications device.

17. The method according to claim 16, wherein the handover support request comprises an indication of an identity of the second communications device.

18. The first communications device, the first communications device comprising:
a transmitter configured to transmit signals representing data to a second communications device over a wireless interface, the signals being received by the second communications device in accordance with a current configuration,
a receiver configured to receive signals representing data transmitted by the second communications device over the wireless interface in accordance with the current configuration, and
a controller configured to control the transmitter and the receiver so that the first communications device is operable:
to determine that the current configuration is to be changed to a first new configuration,
to transmit a first handover command to the second communications device over the wireless interface, the first handover command comprising an indication of the first new configuration to replace the current configuration, and
to receive via the wireless interface a handover reject indication from the second communications device, the handover reject indication transmitted in response to the first handover command and indicating that the second communications device is to continue to operate in accordance with the current configuration.

* * * * *